United States Patent
Rostami et al.

(10) Patent No.: US 9,628,272 B2
(45) Date of Patent: Apr. 18, 2017

(54) PUF AUTHENTICATION AND KEY-EXCHANGE BY SUBSTRING MATCHING

(71) Applicants: WILLIAM MARSH RICE UNIVERSITY, Houston, TX (US); MASSACHUSETTS INSTITUTE OF TECHNOLOGY, Cambridge, MA (US)

(72) Inventors: Masoud Rostami, Houston, TX (US); Mehrdad Majzoobi, Houston, TX (US); Farinaz Koushanfar, Houston, TX (US); Daniel S. Wallach, Houston, TX (US); Srinivas Devadas, Lexington, MA (US)

(73) Assignees: WILLIAM MARSH RICE UNIVERSITY, Houston, TX (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 46 days.

(21) Appl. No.: 14/147,230

(22) Filed: Jan. 3, 2014

(65) Prior Publication Data

US 2015/0195088 A1 Jul. 9, 2015

(51) Int. Cl.
    *H04L 9/08* (2006.01)
    *H04L 9/32* (2006.01)
    *G09C 1/00* (2006.01)

(52) U.S. Cl.
    CPC .............. *H04L 9/0866* (2013.01); *G09C 1/00* (2013.01); *H04L 9/3271* (2013.01); *H04L 9/3278* (2013.01); *H04L 2209/24* (2013.01)

(58) Field of Classification Search
    CPC . H04L 9/3278; H04L 9/3271; H04L 2209/12; G06F 2221/2229; G06F 21/31
    See application file for complete search history.

(56) References Cited

U.S. PATENT DOCUMENTS 6,223,174 B1 *  4/2001  Ladwig et al.
7,010,605 B1 *  3/2006  Dharmarajan ........ H04L 9/0822
                                                   709/227

(Continued)

OTHER PUBLICATIONS

Armknecht, Frederik; Maes, Roel; Sadeghi, Ahmad-reza; Standaert, Francois-Xavier: Wachsmann, Christian: "A Formal Foundation for the Security Features of Physical Functions" IEEE 2011 Symposium on Security and Privacy, DOI 10.1109/SP.2011.10; Oct. 2011; pp. 397-412; (16 pages).

(Continued)

*Primary Examiner* — Linglan Edwards
(74) *Attorney, Agent, or Firm* — Meyertons Hood Kivlin Kowert & Goetzel, P.C.; Jeffrey C. Hood; Mark K. Brightwell

(57) ABSTRACT

Mechanisms for operating a prover device and a verifier device so that the verifier device can verify the authenticity of the prover device. The prover device generates a data string by: (a) submitting a challenge to a physical unclonable function (PUF) to obtain a response string, (b) selecting a substring from the response string, (c) injecting the selected substring into the data string, and (d) injecting random bits into bit positions of the data string not assigned to the selected substring. The verifier: (e) generates an estimated response string by evaluating a computational model of the PUF based on the challenge; (f) performs a search process to identify the selected substring within the data string using the estimated response string; and (g) determines whether the prover device is authentic based on a measure of similarity between the identified substring and a corresponding substring of the estimated response string.

17 Claims, 8 Drawing Sheets

(56) References Cited

U.S. PATENT DOCUMENTS

| | | | | |
|---|---|---|---|---|
| 8,347,091 | B2* | 1/2013 | Nonaka | G06F 21/31 713/168 |
| 9,208,355 | B1* | 12/2015 | Areno | G06F 21/73 |
| 9,219,722 | B2* | 12/2015 | Chellappa | H04L 63/08 |
| 2002/0138728 | A1* | 9/2002 | Parfenov | H04L 63/0815 713/170 |
| 2005/0002532 | A1* | 1/2005 | Zhou et al. | 380/277 |
| 2007/0094556 | A1* | 4/2007 | Udell | G01R 31/318314 714/724 |
| 2008/0028219 | A1* | 1/2008 | Booth | H04L 9/3271 713/171 |
| 2011/0119240 | A1* | 5/2011 | Shapira | 707/693 |

OTHER PUBLICATIONS

Beckmann, Nathan; Potkonjak, Miodrag; "Hardware-Based Public-Key Cryptography with Public Physically Unclonable Functions" IH 2009, LNCS 5806; 2009; pp. 206-220; Springer-Verlag Berlin Heidelberg, Belgium (15 pages).

Majzoobi, Mehrdad; Koushanfar, Farinaz; Potkonjak, Miodrag; "Lightweight Secure PUFs" IEEE 2008 International Conference on Computer-Aided Design (ICCAD'08), Nov. 10-13, 2008; pp. 670-673, San Jose, California, U.S.A. (4 pages).

Ruhrmair, Ulrich; Sehnke, Frank; Solter, Jan; Dror, Gideon; Devadas, Srinivas; Schmidhuber, Jurgen; "Modeling Attacks on Physical Unclonable Functions" In Proceedings of the 17th ACM Conference on Computer and Communications Security (CCS 2010); Oct. 4-8, 2010; pp. 237-249; ACM 978-1-4503-0244-9/10/10; Chicago, Illinois, U.S.A. (13 pages).

Suh, G. Edward; Devadas, Srinivas; "Physical Unclonable Functions for Device Authentication and Secret Key Generation" Proceedings of the 44th Annual Design Automation Conference (DAC 2007); Jun. 4-8, 2007; pp. 9-14; ACM 987-1-59593-627-1/07/0006; San Diego, Calilfornia, U.S.A. (6 pages).

Maes, Roel and Verbauwhede, Ingrid; "Physically Unclonable Functions: A Study on the State of the Art and Future Research Directions" Towards Hardware-Intrinsic Security, Information Security and Cryptography, pp. 3-37; 2010; DOI 10.1007/978-3-642-14452-3_1, Springer-Verlag Berlin Heidelberg, Belgium (35 pages).

Ruhrmair, Ulrich; Solter, Jan; Sehnke, Frank; Xu, Xiaolin; Mahmoud, Ahmed; Stoyanova, Vera; Dror, Gideon; Schmidhuber, Jurgen; Burleson, Wayne; "PUF Modeling Attacks on Simulated and Silicon Data" IEEE Transactions on Information Forensics and Security, vol. 8, No. 11, Nov. 2013; pp. 1876-1891 (16 pages).

Zdenek, (Sid) Paral and Devadas, Srinivas; "Reliable and Efficient PUF-Based Key Generation Using Pattern Matching" IEEE 2011 International Symposium on Hardware-Oriented Security and Trust (HOST); 978-1-4577-1058-2/11; Jun. 5-6, 2011; pp. 128-133; San Diego, California, U.S.A. (6 pages).

Pappu, Ravikanth; Recht, Ben; Taylor, Jason; Gershenfeld, Neil; "Physical One-Way Functions" Science magazine; Sep. 20, 2002; pp. 2026-2030; vol. 297; American Association for the Advancement of Science (AAAS), New York, New York U.S.A. (6 pages).

Gassend, Blaise; Clarke, Dwaine; Van Dijk, Marten; Devadas, Srinivas; "Silicon Physical Random Functions" Proceedings of the 9th ACM Conference on Computer and Communications Security (CCS 2002); Nov. 18-22, 2002; pp. 148-160; ACM 1-58113-612-9/02/0011; Washington, DC, U.S.A. (13 pages).

Majzoobi, Mehrdad; Rostami, Masoud; Koushanfar, Farinaz; Wallach, Dan S.; Devadas, Srinivas; "Slender PUF Protocol: A Lightweight, Robust, and Secure Authentication by Substring Matching" IEEE 2012 Symposium on Security and Privacy Workshops (SPW); DOI 10.1109/SPW.2012.30; May 24-25, 2012; pp. 33-44; San Francisco, California U.S.A. (12 pages).

Majzoobi, Mehrdad; Koushanfar, Farinaz; Potkonjak, Miodrag; "Techniques for Design and Implementation of Secure Reconfigurable PUFs" AMC Transactions on Reconfigurable Technology and Systems, vol. 2, No. 1, Article 5, DOI 10.1145/1502781.1502786; Mar. 2009; pp. 1-33 (33 pages).

Ozturk, Erdinc; Hammouri, Ghaith; Sunar, Berk; "Towards Robust Low Cost Authentication for Pervasive Devices" IEEE 2008 Sixth Annual International Conference on Pervasive Computing and Communications; Mar. 17-21, 2008 (9 pages).

\* cited by examiner

PUF AUTHENTICATION AND KEY-EXCHANGE BY SUBSTRING MATCHING

GOVERNMENT RIGHTS IN INVENTION

This invention was made with government support under Grant No. CNS-0644289, awarded by the National Science Foundation; and under U.S. Army Research Office Grant No. W911NF-11-1-0474, awarded by the U.S. Department of Defense, and U.S. Navy Grant No. N00014-11-1-0885, also awarded by the U.S. Department of Defense. The government has certain rights in the invention.

FIELD OF THE INVENTION

The present invention relates to the field of cryptography, and more particularly, to mechanisms for performing authentication and key exchange in a manner that is robust and immune to reverse-engineering attacks.

DESCRIPTION OF THE RELATED ART

A prover desires to prove its authenticity to a verifier, and to that end, sends authentication information to the verifier. The verifier examines the authentication information, and verifies or rejects the authenticity of the prover based on the authentication information. The prover may use (and may include) a physical unclonable function (PUF) to generate the authentication information, e.g., as described in:

"Slender PUF Protocol: A Lightweight, Robust, and Secure Authentication by Substring Matching", by Mehrdad Majzoobi, Masoud Rostami, Farinaz Koushanfar, Dan S. Wallach, Srinivas Devadas, IEEE CS Security and Privacy Workshops, 24-25 May 2012.

A PUF is a hardware device that receives a challenge (vector of input bits) and produces a response (a vector of output bits), where the space of possible challenges and the space of possible responses are vast, where the relationship between challenge and response is complicated and unique to the individual hardware device.

The prover submits a challenge to the PUF, receives the response from the PUF, and selects a substring of predetermined length from the response. The prover then transmits the selected substring to the verifier. However, the prover does not reveal the position of the substring with the response.

The verifier receives the selected substring and matches the selected substring to a substring of a simulated PUF response. The verifier generates the simulated PUF response by evaluating a model of the PUF on the challenge, i.e., the same challenge used by the prover. If the selected substring and the matching substring of the simulated PUF response are sufficiently close, the verifier declares the prover to be authentic.

The above-described mechanism of authentication makes its difficult for an attacker to accurately model the PUF based on observations of the transmitted substrings. (If the attacker were able to accurately model the PUF, it could pose as a prover, and gain authentication by submitting a selected substring of a response produced from its model.) However, due to the ever-increasing compute power available to attackers, there is a strong incentive to provide ever-increasing levels of authentication security. Thus, improved PUF-based authentication mechanisms are desired. Furthermore, it is generally desirable to transmit secret information (such as keys) from a source to a destination without third parties being able to recover that information, even when they have access to communications between the source and destination.

SUMMARY

In one set of embodiments, a prover device may perform the following method to enable a remote verifier device to authenticate the prover device.

The prover device may generating a data string by: (a) submitting a challenge to a physical unclonable function to obtain a response string, (b) selecting a substring of predetermined length from the response string, (c) injecting the selected substring into the data string, and (d) injecting random bits into bit positions of the data string not assigned to the selected substring. The prover device may transmit the data string to the second device through a communication medium.

The position of the selected substring within the response string and the position of selected substring within the data string are secrets, not revealed by the prover device. Thus, the prover device makes it very difficult for an attacker to model the physical unclonable function from observations of the transmitted data string.

In some embodiments, the action of selecting a substring of predetermined length from the response string may include randomly selecting a number, where a start position of the substring within the response string is determined by the randomly selected number.

In some embodiments, the action of selecting a substring of predetermined length from the response string may include determining a number by encoding a non-empty subset of bits from a key, where a start position of the substring within the response string is determined by the number.

In some embodiments, the action of generating the data string may include randomly selecting a number, where the number determines a start position of the selected substring within the data string.

In some embodiments, the action of generating the data string may include determining a number by encoding a non-empty subset of bits from a key, where a start position of the selected substring within the data string is determined by the number.

In one set of embodiments, a method for operating a verifier device to verify the authenticity of a communicating party may include the following operations.

The verifier device may receive a data string from the communicating party, where the data string is generated by the communicating party by (a) submitting a challenge to a physical unclonable function to obtain a response string, (b) selecting a substring of predetermined length from the response string, (c) injecting the selected substring into the data string, and (d) injecting random bits into bit positions of the data string not assigned to the selected substring.

The verifier device may generate an estimated response string by evaluating a computational model of the physical unclonable function based on the challenge. The computational model may be evaluated in software and/or hardware. The parameters of the computational model are maintained as a secret by the verifier device.

The verifier device may perform a search process to identify the selected substring within the data string using the estimated response string, e.g., by executing a string alignment algorithm.

The verifier device may determine whether the communicating party is authentic based on a measure of similarity (such as Hamming distance) between the identified selected substring and a corresponding substring of the estimated response string.

In some embodiments, the action of selecting a substring of predetermined length from the response string may include randomly selecting a number, where a start position of the substring within the response string is determined by the randomly selected number.

In some embodiments, the action of selecting a substring of predetermined length from the response string may include determining a number by encoding a non-empty subset of bits from a key, where a start position of the substring within the response string is determined by the number. The search process provides an estimate of the number. Thus, the verifier device may recover the non-empty subset of bits of the key from the estimate of the number.

In some embodiments, the action of generating the data string may include randomly selecting a number, where the number determines a start position of the selected substring within the data string.

In some embodiments, the action of generating the data string may include determining a number by encoding a non-empty subset of bits from a key, where a start position of the selected substring within the data string is determined by the number. The search process provides an estimate of the number. Thus, the verifier device may recover the non-empty subset of bits of the key from the estimate of the number.

BRIEF DESCRIPTION OF THE DRAWINGS

A better understanding of the present invention can be obtained when the following detailed description of the preferred embodiments is considered in conjunction with the following drawings.

Figure 1:
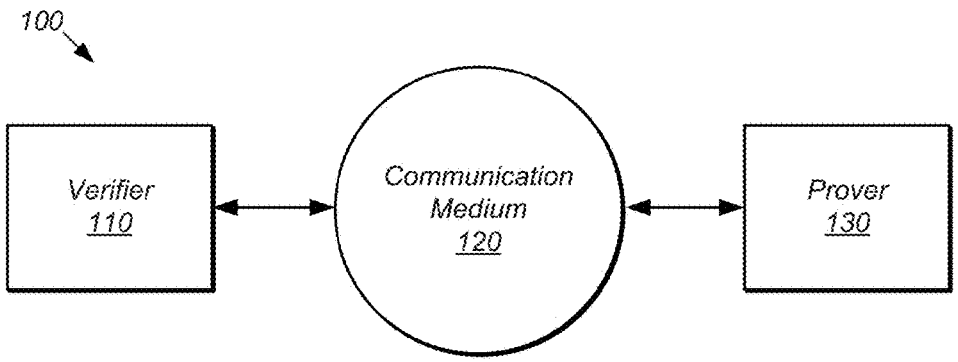
FIG. 1 illustrates a verifier and prover communicating via a communication medium. The prover is interested in being authenticated by the verifier, and thus, sends information to the verifier in order to prove itself to the verifier. The verifier is responsible for verifying the authenticity of the prover.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

A memory medium is a non-transitory medium configured for the storage and retrieval of information. Examples of memory media include: semiconductor-based memory such as various kinds of RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips on a circuit board or on different computers in a network.

A computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, computers implanted in living organisms, computers embedded in head-mounted displays, computers embedded in sensors of a distributed network, computers embedded in a smart card, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

LIST OF REFERENCES

The following publications are referenced in the present patent.

[1] V. Boyko, P. MacKenzie, and S. Patel, "Provably secure password-authenticated key exchange using Diffie-Hellman," in Advances in Cryptology. Springer, 2000, pp. 156-171.

[2] M. Bellare, D. Pointcheval, and P. Rogaway, "Authenticated key exchange secure against dictionary attacks," in Eurocrypt, 2000, pp. 139-155.

[3] P. S. Ravikanth, B. Recht, J. Taylor, and N. Gershenfeld, "Physical one-way functions," Science, vol. 297, pp. 2026-2030, 2002.

[4] B. Gassend, D. Clarke, M. van Dijk, and S. Devadas, "Silicon physical random functions," in Computer and Communication Security Conference (CCS), 2002, pp. 148-160.

[5] U. Ruhrmair, S. Devadas, and F. Koushanfar, Security based on Physical Unclonability and Disorder. Springer, 2011.

[6] F. Armknecht, R. Maes, A. Sadeghi, F.-X. Standaert, and C. Wachsmann, "A formalization of the security features of physical functions," in IEEE Symposium on Security and Privacy, 2011, pp. 397-412.

[7] R. Maes and I. Verbauwhede, "Physically Unclonable Functions: a Study on the State of the Art and Future Research Directions," in Towards Hardware-Intrinsic Security, A.-R. Sadeghi and D. Naccache, Eds. Springer, 2010.

[8] U. Ruhrmair, F. Sehnke, J. Solter, G. Dror, S. Devadas, and J. Schmidhuber, "Modeling attacks on physical unclonable functions," in ACM Conference on Computer and Communications Security (CCS), 2010, pp. 237-249.

[9] Z. Paral and S. Devadas, "Reliable and efficient PUF-based key generation using pattern matching," in International Symposium on Hardware-Oriented Security and Trust (HOST), 2011, pp. 128-133.

[10] M. Majzoobi, M. Rostami, F. Koushanfar, D. S. Wallach, and S. Devadas, "Slender PUF protocol: A lightweight, robust, and secure authentication by substring matching," in IEEE Symposium on Security and Privacy Workshops (SPW). IEEE, 2012, pp. 33-44.

[11] F. Koushanfar, Hardware Metering: A Survey. Springer, 2011.

[12] B. Gassend, D. Clarke, M. Van Dijk, and S. Devadas, "Delay-based circuit authentication and applications," in Proceedings of the 2003 ACM symposium on Applied computing, 2003, pp. 294-301.

[13] D. Lim, "Extracting Secret Keys from Integrated Circuits," Master's Thesis, Massachusetts Institute of Technology, May 2004.

[14] M. Majzoobi, F. Koushanfar, and M. Potkonjak, "Testing techniques for hardware security," in International Test Conference (ITC), 2008, pp. 1-10.

[15] G. Suh and S. Devadas, "Physical unclonable functions for device authentication and secret key generation," in Design Automation Conference (DAC), 2007, pp. 9-14.

[16] B. Gassend, "Physical Random Functions," Master's Thesis, Massachusetts Institute of Technology, Jan 2003.

[17] E. Ozturk, G. Hammouri, and B. Sunar, "Towards robust low cost authentication for pervasive devices," in Pervasive Computing and Communications (PerCom), 2008, pp. 170-178.

[18] U. Ruhrmair, J. Solter, F. Sehnke, X. Xu, A. Mahmoud, V. Stoyanova, G. Dror, J. Schmidhuber, W. Burleson, and S. Devadas, "PUF modeling attacks on simulated and silicon data." IEEE Trans. on Information Forensics and Security, p. 1, 2013.

[19] M. Majzoobi, F. Koushanfar, and M. Potkonjak, "Lightweight secure PUF," in International Conference on Computer Aided Design (ICCAD), 2008, pp. 670-673.

[20] M. Majzoobi, F. Koushanfar, and M. Potkonjak, "Techniques for design and implementation of secure reconfigurable PUFs," ACM Transactions on Reconfigurable Technology and Systems (TRETS), vol. 2, no. 1, 2009.

[21] A. Mahmoud, U. Ruhrmair, M. Majzoobi, and F. Koushanfar, "Combined modeling and side channel attacks on strong pufs," IACR Cryptology ePrint Archive, 2013.

[22] J. Delvaux and I. Verbauwhede, "Fault injection modeling attacks on 65 nm arbiter and ro sum pufs via environmental changes," 2013.

[23] C. Bosch, J. Guajardo, A. Sadeghi, J. Shokrollahi, and P. Tuyls, "Efficient helper data key extractor on FPGAs," in Cryptographic Hardware and Embedded Systems (CHES), 2008, pp. 181-197.

[24] R. Maes, P. Tuyls, and I. Verbauwhede, "Low-overhead implementation of a soft decision helper data algorithm for SRAM PUFs," in Cryptographic Hardware and Embedded Systems (CHES), 2009, pp. 332-347.

[25] M.-D. M. Yu and S. Devadas, "Secure and robust error correction for physical unclonable functions," IEEE Design and Test of Computers, vol. 27, pp. 48-65, 2010.

[26] Y. Dodis, L. Reyzin, and A. Smith, "Fuzzy extractors: how to generate strong keys from biometrics and other noisy data," in Advances in Cryptology-Eurocrypt, 2004.

[27] N. Beckmann and M. Potkonjak, "Hardware-based public-key cryptography with public physically unclonable functions," in Information Hiding. Springer, 2009, pp. 206-220.

[28] M. Majzoobi, G. Ghiaasi, F. Koushanfar, and S. Nassif, "Ultra-low power current-based PUF," in Circuits and Systems (ISCAS), 2011 IEEE International Symposium on. IEEE, 2011, pp. 2071-2074.

[29] M. Baldi, F. Chiaraluce, N. Boujnah, and R. Garello, "On the autocorrelation properties of truncated maximum-length sequences and their effect on the power spectrum," Signal Processing, IEEE Transactions on, vol. 58, 2010.

[30] C. Paar, J. Pelzl, and B. Preneel, "Understanding cryptography: a textbook for students and practitioners," Springer, 2010.

[31] S. Katzenbeisser, U. Kocabas, V. Rozic, A.-R. Sadeghi, I. Verbauwhede, and C. Wachsmann, "PUFs: Myth, fact or busted? A security evaluation of physically unclonable functions (PUFs) cast in silicon," in Cryptographic Hardware and Embedded Systems, 2012, pp. 283-301.

[32] M. Majzoobi, F. Koushanfar, and S. Devadas, "FPGA-based true random number generation using circuit metastability with adaptive feedback control," Cryptographic Hardware and Embedded Systems—CHES 2011, pp. 17-32, 2011.

[33] M. Majzoobi, F. Koushanfar, and S. Devadas, "FPGA PUF using programmable delay lines," in Information Forensics and Security (WIFS), 2010 IEEE International Workshop on. IEEE, 2010, pp. 1-6.

[34] C. K. Koc, Ed., Cryptographic Engineering, 1st edition, Springer, December 2008.

[35] B. Sunar, W. Martin, and D. Stinson, "A provably secure true random number generator with built-in tolerance to active attacks," Computers, IEEE Transactions on, vol. 56, no. 1, pp. 109-119, 2007.

[36] M. Kim, J. Ryou, and S. Jun, "Efficient hardware architecture of SHA-256 algorithm for trusted mobile computing," in Information Security and Cryptology, 2009, pp. 240-252.

[37] S. Drimer, T. Guneysu, and C. Paar, "DSPs, BRAMS, and a pinch of logic: Extended recipes for AES on FPGAs," ACM Trans. on Reconfigurable Technology and Systems, vol. 3, no. 1, p. 3, 2010.

PUF Authentication and Key-Exchange by Substring Matching

In this patent document, we disclose (among other things) robust and low-overhead Physical Unclonable Function (PUF) authentication and key exchange protocols that are resilient against reverse-engineering attacks. The protocols are executed between a party (the Prover) with access to a physical PUF and a trusted party (the Verifier) who has access to the PUF compact model. The presently-disclosed protocols do not follow the classic paradigm of exposing the full PUF responses or a transformation of them. Instead, random subsets of PUF response strings are sent to the Verifier. So the exact position of the subset is obfuscated for the third-party channel observers. Authentication of the responses at the Verifier side is done by matching the substring to the available full response string; the index of the matching point is the actual obfuscated secret (or key) and not the response substring itself. We perform a thorough analysis of resiliency of the protocols against various adversarial acts, including machine learning and statistical attacks. The attack analysis guides us in tuning the parameters of the protocol for an efficient and secure implementation. The low overhead and practicality of the protocols are evaluated and confirmed by hardware implementation.

FIG. 1 shows a verifier 110 and a prover 130 that communicate via a communication medium 120. The communication medium 120 may include any desired physical medium or combination of physical media. For example, the communication medium may include one or more of the following: the atmosphere or free space, a body of water such as an expanse of sea or ocean, a fiber optic channel, a wired channel or cable connection, a portion of the earth's subsurface. In some embodiments, the communication medium 120 may be a computer network such as the Internet. The verifier and the prover may be configured to communicate information over the communication medium 120 in any of a wide variety of conventional ways. For example, the verifier and prover may each be configured to transmit and receive one or more of the following types of signals: electrical signals, electromagnetic signals (such as radio signals, infrared signals, visible light signals or ultraviolet signals), acoustic signals, mechanical signals such as displacement, velocity or acceleration signals, chemical signals or chemical gradient signals, electrochemical signals propagating along neurons, thermal signals, etc.

In some embodiments, the prover 130 is operated by a person or entity that desires access to products and/or services provided by a business. The business may use the verifier 110 in order to authenticate the prover 130 (or person operating the prover) as having legitimate access to the products and/or services.

In some embodiments, the prover 130 is operated by a person or an entity that desires access to information maintained by a business or governmental agency. The business or governmental agency may operate the verifier 110 in order to verify that the prover 130 (or person operating the prover) has authority to access the information.

In some embodiments, the prover 130 is operated by a business or governmental agency that desires to prove its authenticity to a person (or other entity). The person (or other entity) may use the verifier 110 in order to authenticate the business or governmental agency.

In some embodiments, the prover 130 may be a mobile device (such as a cell phone or media player or tablet computer) that is interested in authenticating itself with a wireless network or a service provider. In this case, the communication medium 120 may include a wireless connection with a wireless communication network, and the verifier 110 may be a computer operated by the wireless network or the service provider.

In some embodiments, the communication medium 120 is (or includes) a physical object or entity that passed or transported from the prover 130 to the verifier 110. For example, the prover 130 may write or record information (such as the padded substring PW described herein) on the physical object, and the verifier 110 may read the information from the physical object. The physical object may include memory to support the storage of the information.

The examples given above are just a few of the practically infinite range of possible applications of the presently disclosed methods, and are not meant to be limiting.

In some embodiments, the communication medium 120 is an insecure medium, where third parties are able to access some or all communications transmitted onto the communication medium.

I. Introduction

Classic security paradigms rely on a stored digital secret key and cryptographic algorithms. Secret keys are stored in an on-chip non-volatile memory (NVM). However, on-chip NVM storage is prone to invasive physical attacks (e.g., probing) and non-invasive imaging attacks (e.g., by scanning electron microscopes). Moreover, correct implementation of security algorithms based on a pre-distributed secret key requires Password-Authenticated Key Exchange (PAKE) protocols. These protocols are provably secure; however, they require costly exponentiation operations [1], [2]. Therefore, they are not suitable for many low power resource-intensive applications.

Physical unclonable functions (PUFs) have been proposed [3] to provide a desired level of security with low implementation overhead. One type of PUF is based on silicon, and is designed to bind secrets to silicon hardware [4]. Silicon PUFs use the unclonable intrinsic process variability of silicon devices to provide a unique mapping from a set of digital inputs (challenges) to a set of digital outputs (responses). The imperfections and uncertainties in the fabrication technology make cloning of a hardware circuit with the exact same device characteristics impossible, hence the term unclonable. Moreover, PUFs must be designed to make it prohibitively hard to simulate, emulate, or predict their behavior [4]. Excellent surveys of various PUF designs can be found in [5]—[7].

Strong PUFs are a class of PUFs which have the property that the number of their possible challenge-response pairs (CRPs) has an exponential relationship with respect to the number of their physical components. This huge space of possible CRPs hinders attacks based on pre-recording and re-playing previously used CRPs. However, physical components of a Strong PUF are finite. Therefore, given access to these components, a compact polynomial-order model of the CRP relationships can be built.

A trusted intellectual property owner with physical access to the device (e.g., the original manufacturer) can build such a compact model by measuring the direct responses of the PUF. Such compact models can be treated as a secret which can be used by a trusted Verifier to authenticate the Prover's PUF. (Physical access to these components may be permanently disabled before field deployment to avoid direct compact modeling.) An unfortunate fact is that third party observers may also be able to model the PUF based on a finite number of CRPs exchanged on the communication channel as has been done before. See, e.g., [8]. This type of PUF modeling by untrusted third parties is also called a machine-learning or reverse-engineering attack, as it harms the PUF security. Such attacks were possible because the challenge and response strings leak structural information about the PUF and compact models.

In this patent disclosure, we describe (among other things) secure, low overhead, and robust authentication and key exchange protocols (e.g., for Strong PUFs) that thwart machine-learning attacks. The protocols enable a Prover with physical access to the PUF to authenticate itself to a trusted Verifier. It is assumed that the trusted Verifier has access to the secret compact PUF model. The protocol leaks a minimal amount of information about secret PUF parameters on the communication channel. This is because the secret is the index of a response substring, which is selected (e.g., randomly) from the full response string. The Prover also adds random padding strings before and after the response substring. The indices (i.e., lengths) of the padding strings are also a part of the secret.

In some embodiments, only the padded substring is sent on the channel. Since the indices are not correlated with the substring content in any way, the secret itself is never exposed on the communication channel. The Verifier, with access to the full string, can perform a substring matching, and thereby discover the secret index. The matched strings may not be the same, but as long as they are within a small distance of each other (as defined by a threshold), the matching is declared to be successful. Therefore, the method is inherently robust to the noise in the PUF responses, eliminating the need for costly error correction or fuzzy extraction.

The protocol may be devised such that the Verifier and the Prover jointly generate the challenges to the PUF. The challenges may be generated in a way that neither a dishonest Prover nor a dishonest Verifier can solely control the challenges used for authentication. While none of the authenticating parties can solely control the challenges, the resulting challenge values are publicly known. The authentication protocol, described above, can also be leveraged to implement a low-power and secure key-exchange algorithm. The Prover only needs to select a key (e.g., a random password) and then encode it as a set of secret indices to be used in the authentication protocol.

We provide a thorough discussion of the complexity and effectiveness of attacks on the presently-disclosed protocols. The protocols are designed to achieve robustness against inherent noise in PUF response bits, without costly traditional error-correction modules. We demonstrate that our protocols can be implemented with a few simple modules on the Prover side. Therefore, we do not need expensive cryptographic hashing and classic error-correction techniques that have been suggested in earlier literature for achieving security. Note that recent work has used pattern matching for correcting errors while generating secret keys from a PUF [9]. However, unlike the presently-disclosed key-exchange protocol, the number of generated secret keys was limited. In addition, a higher level of protection against machine learning attacks can be achieved by the presently-disclosed protocols.

We have published a paper [10] on PUF-based authentication. That paper only discussed the application of PUFs for robust and attack-resilient authentication and did not propose a key exchange protocol based on PUFs. The proposed authentication protocol in [10] achieves a lower level of security than the protocol disclosed in this patent. This is because we also add random padding to the PUF substring, which generates a larger number of secret indices.

In brief, some of the new contributions of the present patent disclosure are as follows:

(a) We introduce and analyze two lightweight and secure protocols based on substring-matching of PUF response strings to perform authentication and session key exchange.

(b) The protocols automatically provide robustness against inherent noise in the PUF response string, without requiring externally added and costly traditional error-correction modules or fuzzy extraction.

(c) We perform a thorough analysis of the resiliency of protocols against a host of attacks.

(d) Our analyses provide guidelines for setting the protocol parameters for robust and low-overhead operation.

(e) The lightweight nature, security and practicality of the new protocol are confirmed by a set of hardware implementation and evaluations.

If the reader is familiar with PUF circuits and its related literature, he/she may now jump to Section IV.

II. Background on Strong Pufs

In this section, without loss of generality, we introduce a popular instance of Strong PUF known as arbiter PUF or delay-based PUF. Desired statistical properties of a Strong PUF are briefly reviewed, and XOR mixing of arbiter PUFs to improve the statistical properties is discussed. Note the presently-disclosed protocol may be used with any desired PUF. However, it is generally preferable for the PUF to be Strong PUF that satisfies the requirements discussed in this section.

A. Strong PUFs and their Implementation

There are a number of different PUF types, each with a set of unique properties and applications. For example, Weak PUFs, also known as Physically Obfuscated Keys (POKs) are commonly used for key generation applications. The other type is called Strong PUF [11]. Strong PUFs are built based on the unclonable disorder in the physical device features, with very many challenge-response pairs. The size of the CRP space is an exponential function of the number of underlying components. Strong PUFs have the property that they are prohibitively hard to clone; a complete enumeration of all their CRPs is intractable. To be secure, they should be resilient to machine learning and prediction attacks.

Figure 2:
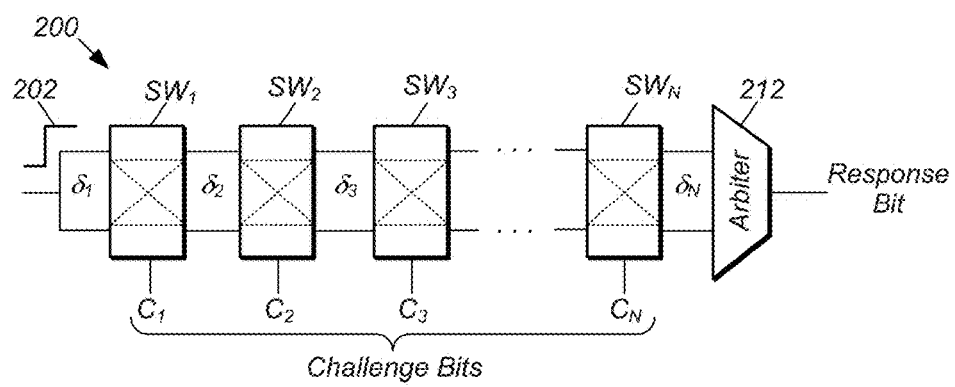
FIG. 2 shows one embodiment of an arbiter linear PUF block with an N-component challenge vector and one response bit. The arbiter converts the analog delay difference between the two paths to a digital value.

In some embodiments of the presently-disclosed protocols, we use a Strong PUF implementation called "delay-based arbiter PUF" introduced in [12]. In this PUF, the delay difference between two parallel paths is compared. The paths are built identically to make their nominal delays equal by design. However, the delay of fabricated paths on chips will be different due to process variations. See FIG. 2. A step input 202 simultaneously triggers the two paths. At the end of the two parallel (racing) paths, an arbiter 212 (typically a D-Flip Flop) is used to convert the analog difference between the paths to a digital value. The arbiter output (i.e., the response bit) is one if the signal arrives at its first input earlier than the second input; otherwise, it stays at zero. The two paths are divided into several smaller sub-paths by inserting path-swapping switches $SW_1$ through $SW_N$. Each set of inputs $\{C_i\}$ to the switches acts as a challenge set (denoted by vector C). Each switch has two inputs and two outputs, and couples the inputs to the outputs in either an identity configuration ($IN_0 \rightarrow OUT_0$ and $IN_1 \rightarrow OUT_1$) or a crossover configuration ($IN_0 \rightarrow OUT_1$ and $IN_1 \rightarrow OUT_0$), depending on the current value of the corresponding challenge bit $C_i$.

In some embodiments, the PUF includes only linear addition and subtraction of delay elements. Therefore, the behavior of the PUF can be modeled by the following expressions [13]:

$$\Delta t = \sum_{j=1}^{N} (-1)^{\rho_j} \delta_j + \delta_{N+1}, \quad (1A)$$

$$r = \begin{cases} 0 & \text{if } \Delta t < 0 \\ 1 & \text{if } \Delta t > 0 \end{cases}, \quad (1B)$$

where $\Delta t$ denotes the arrival time difference between the two paths at the arbiter, where r denotes the response bit, where $\rho_j$ is related to the input challenge that controls the switch selectors by the following relation, $$\rho_i = \bigoplus_{x=i,i+1,\ldots,N} c_x = c_i \oplus c_{i+1} \oplus \ldots \oplus c_N. \quad (2)$$

According to expression 1B, if the path delay difference is greater than zero, then the response will be '1'; otherwise the response is '0'. To simplify the notations, expressions 1A and 1B, can be rewritten as:

$$r = \text{Sign}(\Delta \cdot \Phi), \quad (3)$$

where $$\Delta = [\delta_1, \delta_2, \ldots, \delta_{N+1}]$$

is the delay parameter vector, where $$\Phi = [(-1)^{\rho_1}, (-1)^{\rho_2}, \ldots, (-1)^{\rho_N}, 1] = [\phi_1, \phi_2, \ldots, \phi_{N+1}]$$

is the transformed challenge vector, in which $\phi_i \in \{1, -1\}$, where "•" is the dot product operator, and Sign is the sign function. We will refer to C as the input challenge vector in the remainder of the disclosure. Note that the parameters $\Phi$, $\rho$, and C are related to each other.

B. Linear Arbiter PUF Statistical Properties

In this subsection, the statistical properties of a linear arbiter PUF are reviewed. It has been demonstrated in [14] that when the delay parameters $\delta_j \in \Delta$ come from identical symmetric distributions with zero mean (in particular it is safe to assume that the $\delta$s are independent and identically distributed Gaussian variables, i.e., $$\delta_j \in N(0, \sigma),$$

j=1, 2, . . . , N+1, then the following statistical properties hold for a linear arbiter PUF:

(a) The output response bits are equally likely over the entire space of challenges, i.e., $$\text{Prob}\{r=-1\} = \text{Prob}\{r=1\} = 0.5.$$

Half of the challenges map to r=−1 and the other half maps to r=1.

(b) The responses to similar challenges are similar. In other words, the probability that the responses $r_0$ and $r_1$ to respective input challenge vectors $C_0$ and $C_1$ are different is a monotonically increasing function of the Hamming distance between the input challenges, i.e., $$\text{Prob}\{r0 \neq r1\} = f(HD(C_0, C_1)).$$

For example, in the trivial cases, $HD(C_0, C_1) = 0$, i.e., $C_0 = C_1$, then $\text{Prob}\{r0 \neq r1\} = 0$. The Hamming distance between challenges $C_x$ and $C_y$ may be defined as $$HD(C_x, C_y) = \sum_{i=1}^{N} |C_x[i] - C_y[i]|/N,$$

where $C_x[i], C_y[i] \in \{-1, 1\}$. As the Hamming distance between the input challenge vectors becomes larger, the probability of having different PUF response bits increases.

The second property leaks information about the PUF response sequence, which would help in breaking the PUF security by pattern matching. Ideally, PUFs are expected to have a property called strict avalanche criterion. Any flip in the challenge bits of a PUF with avalanche criterion should cause the response bits to flip with probability of 50%. Any deviation from this criterion reduces the security of the system built based on these PUFs. To achieve this criterion, it has been proposed in [14] and [15] to mix the responses from the arbiter PUFs with XOR logic. In the next subsection, we review this subclass of PUFs.

C. XOR-Mixed Arbiter PUFs

Figure 3:
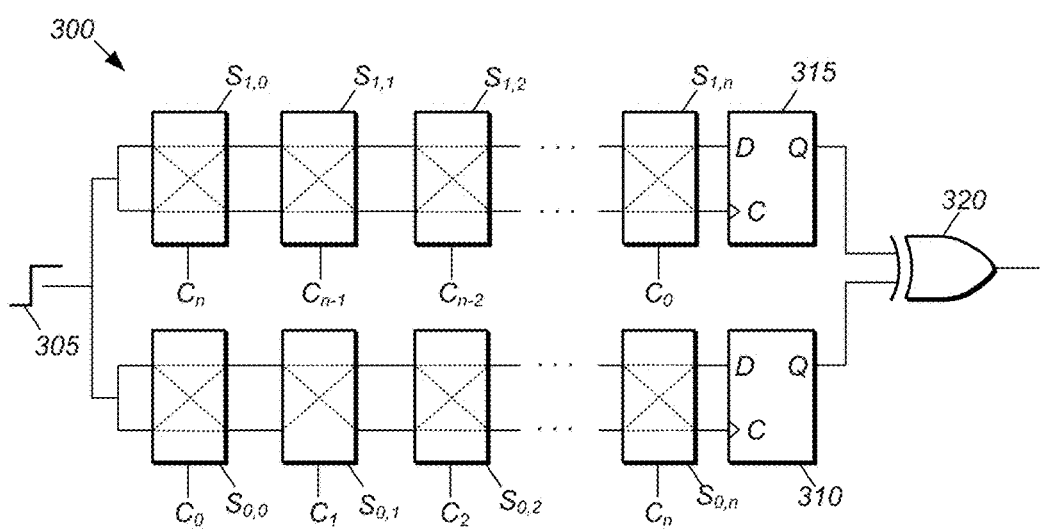
FIG. 3 illustrates one embodiment of a system comprising two independent linear arbiter PUFs whose outputs are XOR-mixed in order to implement an arbiter PUF with better statistical properties. The challenge sequence in the second stage is applied in the reverse order (relative to the application order in the first stage) to help achieve this property.

FIG. 3 shows a two-stage XOR-mixed arbiter PUF denoted with label 300. The first stage includes switches $S_{0,0}$ through $S_{0,n}$ and flip-flop 310. The second stage includes switches $S_{1,0}$ through $S_{1,n}$ and flip-flip 315. The output of the first stage and the output of the second stage are coupled to the inputs of an XOR gate 320. The step input 305 is supplied to the inputs of both stages. Note that the challenge sequence in the second stage is applied in reverse order relative to the order of application in the first stage. The order is reversed to help achieve the avalanche criterion. As more independent PUF response bits are mixed, the probability that the output is flipped when one input bit changes, comes closer to the ideal probability of 0.5.

In addition to achieving the avalanche criterion, the XOR-mixed arbiter PUF requires a significantly larger set of challenge-response pairs to successfully train the PUF model for a given target level of accuracy. However, there is a cap on the number of stages that can be actually used in practice. This is due to the fact that XOR-mixing causes error accumulation of PUF responses. For instance, for a single PUF response bit error of 5%, the probability of error for a 4-XOR-mixed PUF is 19% [14]. The protocols disclosed in this patent disclosure allow a higher level of security without increasing the number of XOR stages.

III. Related Work

PUFs have been subject to modeling attacks. The basis for contemporary PUF modeling attacks is collecting a set of CRPs, and then building a numerical or an algorithmic model from the collected data. For the attack to be successful, the models should be able to correctly predict the PUF response to new challenges with a high probability. Previous work on PUF modeling (reverse engineering) used various machine learning techniques to attack both implementation and simulations of a number of different PUF families, including linear arbiter PUFs and feed-forward arbiter PUFs [8], [13], [14], [16], [17]. More comprehensive analysis and description of PUF security requirements to protect against modeling attacks were presented in [18]—[20]. In recent years, there has been an ongoing effort to model and protect PUFs against side channel attacks such as power analysis [21] and fault injection [22].

Extracting secret keys from PUF responses has been explored in previous work, including [4], [16] and [23]—[25]. Since cryptographic keys need to be stable, error correction is used for stabilizing inherently noisy PUF response bits. The classic method for stabilizing noisy PUF bits (and noisy biometrics) is error correction, which is done by using helper bits or syndrome [26], which has a high overhead.

In the context of challenge-response based authentication for Strong PUFs, sending the syndrome bits for correcting the errors before hashing was investigated [4]; the necessity for error correction was due to hashing the responses before sending them to avoid reverse engineering. Naturally, the inputs to the hash have to be stable to have a predictable response. The proposed error-correction methods in this context are classic error correction and fuzzy extraction techniques. Aside from sensitivity to PUF noise (because it satisfies the strict avalanche criterion), hashing and error correction has the drawback of high overhead in terms of area, delay, and power.

A newer information-theoretically secure Index-Based Syndrome (IBS) error correction coding for PUFs was introduced and realized in [25]. In [27], authors proposed the notion of public physically unclonable functions (PPUF) and proposed a public key-exchange protocol based on them.

All of the aforementioned methods incur a rather high overhead of error correction and/or hashing, which prohibits their usage in lightweight systems. An alternative efficient error correction method by pattern matching of responses was very recently proposed [9]. However, their proposed protocol and application area was limited to secret key generation.

This patent disclosure introduces (among other things) lightweight PUF authentication and commitment protocols based on string pattern matching and covert indices. Modeling attacks against these protocols is thwarted by leaking very limited information from a PUF response string. The random indices used in the protocols are inherently independent of the response string content.

IV. Authentication and Key Exchange Protocols

In this section, an authentication and key exchange protocol are introduced and explained in detail. The protocols may be based on a Strong PUF with acceptable statistical properties, like the one shown in FIG. 3. The authentication protocol enables a Prover with physical access to the PUF to authenticate itself to a Verifier, and the key exchange protocol enables the Prover and the Verifier to securely exchange secret keys between each other.

It is assumed that an honest Verifier has access to a compact secret model of the functional relationship between challenge and response of the Strong PUF. Such a model can be built by training a compact parametric model of the Strong PUF on a set of direct challenge-response pairs. As long as the responses of the challenge-response pairs are obtained from the linear PUF, right before the XOR-mixing stage, building and training such a compact model is possible with a relatively small set of CRPs as demonstrated in [8], [13], [14], [16], [17]. The physical access to the measurement points may then be permanently disabled before deployment, e.g., by burning irreversible fuses, so other entities cannot build the same model. Once these access points are blocked, any physical attack that involves de-packaging the chip will likely alter the shared secret.

Unlike the original PUF challenge-response pair identification and authentication methodologies, our protocols are devised such that both Prover and Verifier jointly participate in producing the challenges. The joint challenge generation provides effective protection against a number of attacks. Unlike original PUF methods, an adversary cannot build a database of CRPs and use an entry in the database for authentication or key exchange. The next two subsections describe various embodiments of our protocols in detail. The last subsection concludes the section with some notes about the PUF secret-sharing process.

A. Authentication Protocol

Figure 4:
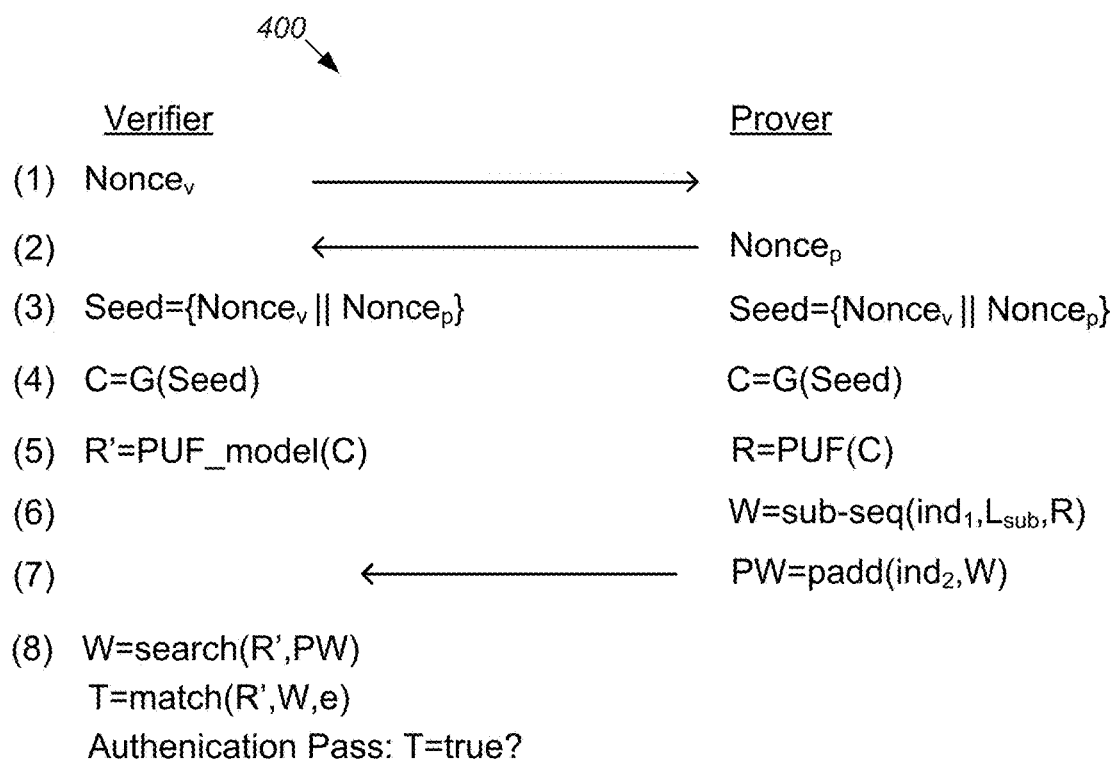
FIG. 4 shows one embodiment of a method for executing a PUF-based authentication protocol.

FIG. 4 illustrates an embodiment 400 of our authentication protocol. Steps 1-4 of the protocol ensure joint generation of the challenges by the Prover and the Verifier. In Steps 1-2 the Prover and the Verifier may each use its own true random number generator (TRNG) unit to generate a nonce. (Note that arbiter PUFs can also be used to implement a TRNG [28].) The Prover-generated nonce and the Verifier-generated nonce are denoted respectively by $Nonce_p$ and $Nonce_v$. The nonces are exchanged between the parties, so both entities have access to $Nonce_p$ and $Nonce_v$. Step 3 generates a random seed by concatenating the individual nonces of the Prover and the Verifier. In other words, $$Seed=\{Nonce_v \| Nonce_p\}.$$

where "$\|$" denotes the concatenation operator.

The generated Seed is used by a pseudo-random number generator (PRNG) in Step 4. Both the Prover and the Verifier have a copy of this PRNG module. The PRNG output using the seed, i.e., $$C = G(\text{Seed}),$$

is then applied to the PUF as a challenge set (C). Note that in this way, neither the Prover nor the Verifier has full control over the PUF challenge stream.

In Step 5, the Prover applies the challenges to its physical PUF to obtain a response stream (R), i.e., $$R = \text{PUF}(C).$$

An honest Verifier with access to a secret compact model of the PUF ("the PUF model") also estimates the PUF output stream, i.e., $$R' = \text{PUF\_model}(C).$$

Let us assume that the full response bitstring R is of length L. In Step 6, the Prover randomly chooses an index ($ind_1$) that points to a location in the full response bitstring. (This index may be of bit-size $\log_2(L)$.) This index points to the beginning of a substring (W) with a predefined length denoted $L_{sub}$. We use the full response string in a circular manner, so that if $$(ind_1 + L_{sub}) > L,$$

the remainder of the substring values are taken from the beginning of the full response bitstream:

$$W(j) = R((j + ind_1) \bmod L)),$$

Figure 5A:
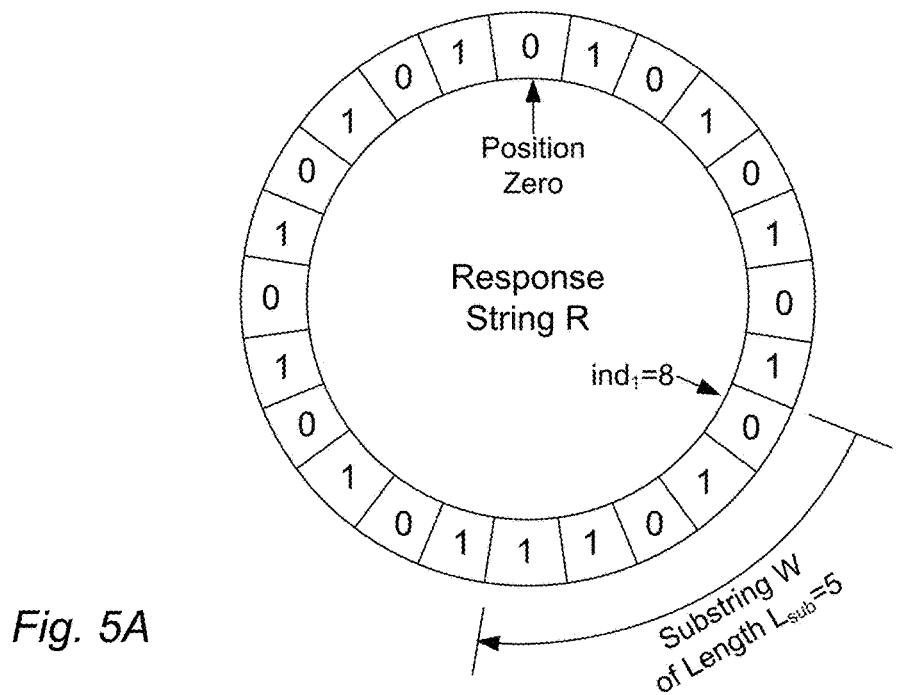
FIG. 5A illustrates an example of the circular extraction of a substring W of length $L_{sub}=5$ from a response string R of length L=24.

$j = 0, 1, \ldots, L_{sub} - 1$.
This operation is illustrated in FIG. 5A.

In step 7, the Prover pads the substring W with random bits to create a bitstream PW of length $L_{PW}$. (The bitstream PW is also referred to herein as "the padded substring".) In this padding process, starting from a randomly chosen index ($ind_2$), the PUF substring W from step 6 is inserted. The substring W may be inserted into the padded substring PW according to a circular insertion scheme or a linear insertion scheme. In the circular insertion scheme, if the value ($ind_2 + L_{sub}$) is greater than $L_{PW}$, the remainder of the substring values are taken from the beginning of the full response bitstream.

$$PW(k) = R((k + ind_1) \bmod L))$$

Figure 5B:
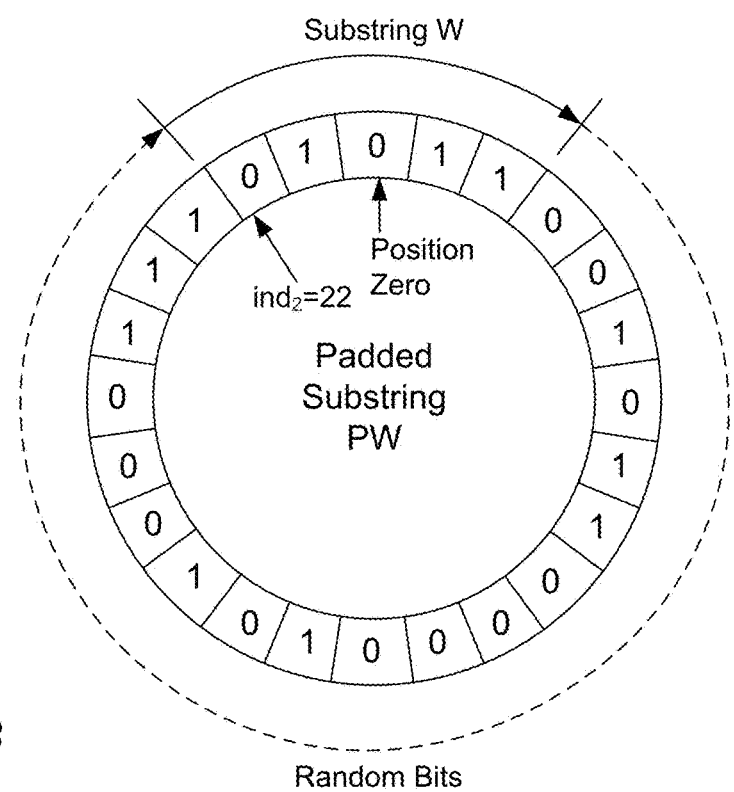
FIG. 5B illustrates an example of the circular padding of the extracted substring W with random bits to form a padded substring PW of length $L_{PW}=24$.

$k = ind_2, ind_2 + 1, ind_2 + 2, ind_2 + L_{sub} - 1$.
This operation is illustrated in FIG. 5B. In the linear insertion scheme, the substring W is injected into the padded substring PW as one contiguous whole, i.e., without allowing the substring W to circularly wrap within the padded substring PW. Thus, the value of $ind_2$ is constrained to be in the range $\{0, 1, \ldots, L_{PW} - L_{sub}\}$.

In step 8, when an honest Verifier receives the padded substring PW, he performs a circular maximum-sequence alignment against his simulated PUF output sequence (R') to determine which bits belong to the PUF response string and which bits were generated randomly. The authentication is declared to be successful only if the Hamming distance between the received substring R and the simulated substring R' is lower than a predefined threshold value. After this operation, the Verifier determines the value of the secret indices $ind_1$ and $ind_2$. However, these values do not affect the authentication process.

In the authentication process, the Prover does not reveal the whole response stream and the protocol leaks a minimal amount of information. The protocol is also lightweight and suitable for ultra-low power and embedded devices. In the above-described embodiments, besides a PUF (e.g., a Strong PUF), the Prover only needs to implement one TRNG and one PRNG. In addition to exchanging their respective session nonces, the Prover only needs to send a relatively short padded substring to the Verifier. Additionally, the protocol has the added benefit that the ranges of the respective secret indices $ind_1$ and $ind_2$ are flexible and can be tuned depending on the security requirements. The matching threshold can also be calculated to tolerate a predefined PUF error threshold.

Figure 6A:
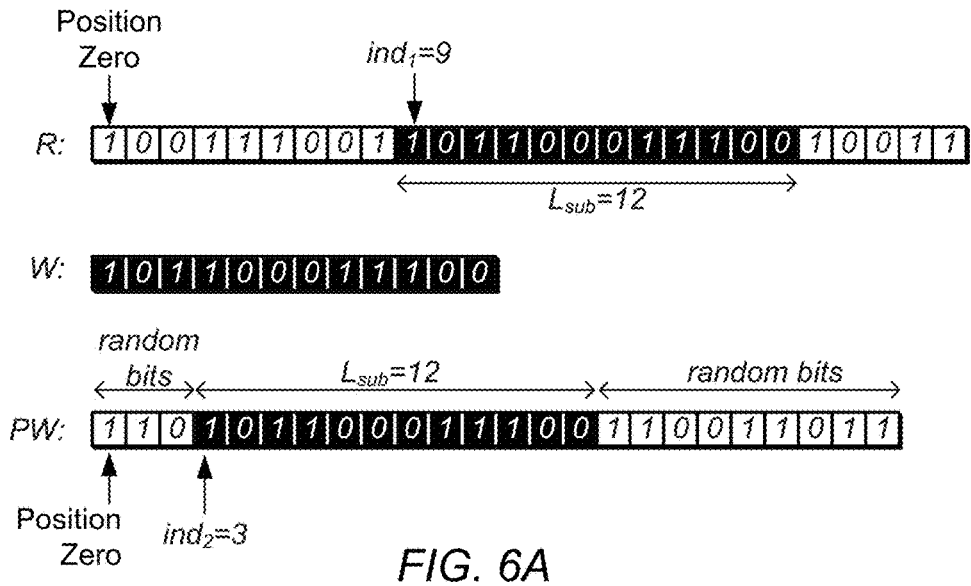
FIG. 6A illustrates an embodiment of the substring extraction and padding steps performed by the Prover, where the substring W is injected into the padded substring PW as one contiguous whole, i.e., without allowing the substring W to circularly wrap within the padded substring. Top: random selection of an index value $ind_1$. Middle: extracting a substring W of a predefined length. Bottom: padding the substring W with random bits.

FIG. 6A illustrates an embodiment of the extraction and padding processes, where the substring W is injected into the padded substring PW as one contiguous whole, i.e., without allowing the substring W to circularly wrap within the padded substring PW. Thus, the value of $ind_2$ is constrained to be in the range $\{0, 1, \ldots, L_{PW} - L_{sub}\}$. In the illustrated example, a substring W of length $L_{sub} = 12$ is extracted from a response string R of length $L = 26$. The substring W is extracted with a start position given by $ind_1 = 9$. The substring W is injected into a padded substring PW of length $L_{PW} = 24$ with start position given by $ind_2 = 3$.

Figure 6B:
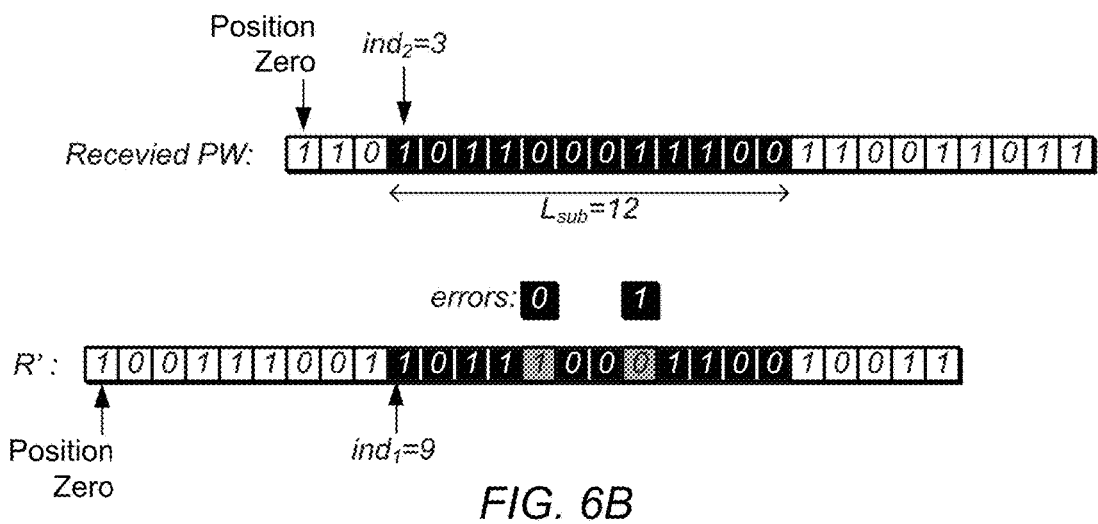
FIG. 6B illustrates an embodiment of a process by which the Verifier matches the received padded substring (PW) against his simulated PUF response R', assuming that the substring W occurs within the padded substring PW as one contiguous whole, i.e., without circular wrapping. The authentication is deemed to be successful if the Hamming distance between the received substring W and the simulated substring is lower than a predefined threshold value.

FIG. 6B continues with the example of FIG. 6A, and illustrates the process whereby the Verifier matches the received padded substring PW against his model-generated PUF response R', assuming that the substring W occurs as one contiguous whole within the padded substring PW, i.e., without circularly wrapping. Note that the model-generated PUF response R' is not exactly equal to the PUF response R. Two error bits are shown. The authentication is declared to be successful if the Hamming distance between the substring W and the corresponding portion of the model-generated PUF response R' is lower than a predefined threshold value.

B. Session Key-Exchange Protocol

It is possible to piggyback a session key-exchange protocol on the authentication protocol of FIG. 4. The Prover can encode secret keys in the secret indices of authentication protocol, e.g., in indices $ind_1$ and $ind_2$. The Verifier can recover these secret indices at the end of a successful authentication. If the length of secret indices is not enough to encode the whole secret key, the authentication protocol may be repeated multiple times until the required number of secret bits is transmitted to the Verifier. We now describe this concept with an example.

If the length of PUF response string is 1024 bits, $ind_1$ is chosen from the range of 0 to 1023. Therefore, we can encode 10 bits by using $ind_1$. If the length $L_{PW}$ of the padded substring PW is 1024 bits, $ind_2$ is chosen from the range 0 to 1023. Therefore, 10 bits of a secret key can be encoded by $ind_2$. In this parameter configuration, 20 bits overall can be exchanged between the parties with one run of the authentication protocol. If the length of the secret key is 120 bits, the protocol of FIG. 4 should be executed 6=120/20 times to transfer the entire secret key. The present key exchange protocol can securely exchange session keys with minimum overhead, while protecting against machine learning attacks and PUF response errors.

The key-exchange protocol can be followed up with a step to check whether the Verifier has received the correct indices. To do so, the Prover only needs to send the hashed values of the indices to the Verifier for verification.

C. Secret Sharing

So far we have assumed that the Verifier possesses a model of the PUF and uses the model to authenticate the Prover. The PUF may have an e-fuse to protect the secret and prevent modeling attacks. The chip sets may be handled by a trusted party before distributing the chip sets to end users. The trusted party performs modeling on the PUF and disables the fuse before distribution. Anyone with access to the IC afterwards will not be able to model the PUF since the fuse is disabled. The trusted party can share the PUF models with other authorized trusted parties that want to authenticate the ICs.

The e-fuse mechanism is operates as follows. Before the e-fuse is disabled, the inputs to the XOR logic of the arbiter PUF can be accessed from chip IO pins. (XOR is an acronym for "Exclusive OR". IO is an acronym for input-output.) This way, the Verifier can obtain as many CRPs as needed to build an accurate model of the PUF. After the model is successfully trained, the trusted party and/or the Verifier disables the e-fuse so that no one else can obtain the "raw" PUF output before the XOR-mixing stage.

V. Analysis of Attacks

In this section, we quantify the resistance of the presently-disclosed protocols against different attacks by a malicious party (Prover or Verifier). Due to the similarity of the authentication and key exchange protocols, similar attacks analysis apply to both of them.

In the first subsection, we quantitatively analyze their resiliency to machine learning attacks. Second, we probabilistically investigate the odds of breaking the protocols by random guessing. Third, we address the attack where a dishonest Prover (Verifier) attempts to control the PUF challenge pattern. Lastly, the effects of non-idealities of PUFs and PRNGs and their impact on protocol security are discussed. Throughout our analysis in this section, we investigate the impact of various parameters on security and reliability of protocol operation. Table I lists these parameters.

TABLE I

LIST OF PARAMETERS

| Parameter | Description |
|---|---|
| $L_n$ | Length of nonce. |
| $L$ | Length of PUF response string. |
| $L_{sub}$ | Length of PUF response substring. |
| $L_{PW}$ | Length of padded substring. |
| $ind_1$ | Index to the beginning of the substring, where $0 \leq ind_1 < L$. |
| $ind_2$ | Index at which the PUF substring is inserted, where $0 \leq ind_2 < L_{PW}$. |
| $N_{min}$ | Minimum number CRPs needed to train the PUF model with a misclassification rate of less than $\epsilon$. |
| k | Number of XORed PUF outputs |
| N | Number of PUF switch stages |
| th | Matching distance threshold |
| $\epsilon$ | PUF modeling misclassification rate |
| $p_{err}$ | Probability of error in PUF responses |

A. PUF Modeling Attack

In order to model a linear PUF with a given level of accuracy, it is sufficient to obtain a minimum number ($N_{min}$) of direct challenge-response pairs (CRPs) from the PUF. $N_{min}$ depends on the PUF type and also the learning strategy. Based on theoretical considerations (e.g., dimension of the feature space, Vapnik-Chervonenkis dimension), it is suggested in [8] that the minimal number of CRPs, $N_{min}$, that is necessary to model a N-stage delay based linear PUF with a misclassification rate of $\epsilon$ is given by:

$$N_{min} = O(N/\epsilon). \tag{4}$$

For example, a PUF model with 90% accuracy, has a misclassification rate of $\delta = 10\%$. In the presently-disclosed protocol, the direct responses are not revealed and the attacker needs to correctly guess the secret indices to be able to discover $L_{sub}$ challenge-response pairs. $ind_1$ is a number between 0 and $L-1$. ($L$ is the length of the original response string R from which the substring W is obtained.) $ind_2$ is a number between 0 and $L_{PW}-1$. ($L_{PW}$ is the length of the padded substring PW.)

Assuming the attacker tries to randomly guess the indices, he will be faced with $L \times L_{PW}$ choices. For each iter choice, the attacker can build a PUF model ($M_{iter}$) by training it on the set of $L_{sub}$ challenge-response pairs using machine learning methods.

Now, the attacker could launch $L \times L_{PW}$ rounds of authentication with the Verifier and each time use one of his trained models instead of the actual PUF. If he correctly guesses the indices and his model is accurate enough, one of his models will pass authentication. To build an accurate model as mentioned above, the attacker needs to obtain $N_{min}$ correct challenge-response pairs. If $L_{sub} > N_{min}$, then the attacker can break the system with $O(L \times L_{PW})$ number of attempts. However if $L_{sub} < N_{min}$, then the attacker needs to launch $N_{min}/L_{sub}$ rounds of authentication to obtain at least $N_{min}$ challenge-response pairs. Under this scenario, the number of hypothetical PUF models will grow exponentially. Since for each round of authentication there are $L \times L_{PW}$ models based on the choice of index values $ind_1$ and $ind_2$, for $N_{min}/L_{sub}$ rounds, the number of models will be of the following order:

$$(L \times L_P)^{\frac{N_{min}}{L_{sub}}}. \tag{5}$$

From the above equation, it seems intuitive to choose small values for $L_{sub}$, to make the exponent bigger. However, small $L_{sub}$ increases the success rate of random guessing attacks. The implications of small $L_{sub}$ will be discussed in more detail in the next section.

The model that the attacker is building has to be only more accurate than the specified threshold during the matching. For example, if we allow a 10% tolerance during the substring matching process, then it means that a PUF model that emulates the actual PUF responses with more than 90% accuracy will be able to pass authentication. Based on Eq. 4, if we allow higher misclassification rate $\epsilon$, then a smaller number of CRPs is needed to build an accurate enough model which passes the authentication.

To improve the security while maintaining reliable performance, $N_{min}$ must be increased for a fixed $\epsilon$ and N. This requires a structural change to delay based PUF. In some embodiments, we use the XOR PUF circuit shown in FIG. 3 for two reasons. First, to satisfy the avalanche criterion for the PUF. Second, to increase $N_{min}$ for a fixed $\epsilon$. Based on the results reported in the experimental evaluation section, $N_{min}$ is an order of magnitude larger for XOR PUF than for a simple delay based PUF.

B. Random Guessing Attack

A legitimate Prover should be able to generate a padded substring of PUF responses that successfully match a substring of the Verifier's emulated response sequence. The legitimate Prover must be authenticated by an honest Verifier with a very high probability, even if the response substring contains some errors. Therefore, the protocol allows some tolerance during matching by setting a threshold on the Hamming distance of the source and target substrings.

Simultaneously, the probability of authenticating a dishonest Prover should be extremely low. These conditions can be fulfilled by carefully selecting the Hamming distance threshold (th), the substring length ($L_{sub}$), the total length of the padded substring ($L_{PW}$), and the original response string length (L) by our protocol. A dishonest Prover without access to the original PUF or its model, may resort to sending a substring of random bits. In this case, the probability of authentication by a randomly guessing attacker, denoted $P_{ADV}$, would be:

$$P_{ADV} = (L \cdot L_{PW}) \times \sum_{i=L_{sub}-th}^{L_{sub}} \binom{L_{sub}}{i}(1/2)^i (1/2)^{L_{sub}-i}, \quad (6)$$

where $L_{sub}$ and th are the length of the substring and the Hamming distance threshold, respectively. Eq. 6 is derived with this assumption that the adversary has $L \cdot L_{PW}$ chances to match the simulated PUF response, and in each match, the probability of success is calculated using a binomial cumulative distribution function.

For an honest Prover, the probability of being correctly authenticated, denoted by $P_{Honest}$ is:

$$P_{Honest} = \sum_{i=L_{sub}-th}^{L_{sub}} \binom{L_{sub}}{i}(1-p_{err})^i p_{err}^{L_{sub}-i}, \quad (7)$$

where $p_{err}$ is i the probability of an error in a response bit.

If $L_{sub}$ is chosen to be a sufficiently large number, $P_{ADV}$ will be close to zero, and $P_{Honest}$ will be close to one.

C. Compromising the Random Seed

In the protocol, the Prover and the Verifier jointly generate the random PRNG seed by concatenating the outputs of their individual nonces (generated by TRNGs); i.e., seed={$Nonce_v$||$Nonce_p$}.

The stream of PRNG outputs after applying the seed is then used as the PUF challenge set. This way, neither the Prover nor the Verifier has full control over generating the PUF challenge stream.

If one of the parties can fully control the seed and challenge sequence, then the following attack scenario can happen. An adversary that poses as a Verifier can manipulate an honest Prover into revealing the secret information. If the same seed is used over and over during authentication rounds, then the generated response sequence (super-string) will always be the same. The response substrings now come from the same original response string. By collecting a large enough number of substrings and putting the pieces together, the original super-string can be reconstructed. Reconstruction will reveal L CRPs. By repeating these steps, more CRPs can be revealed and the PUF can be ultimately modeled.

An imposter Prover (Verifier) may intentionally keep his/her portion of the seed constant to reduce the entropy of seed. This way, the attacker can exert more control over the random challenges applied to the PUF. We argue that if the seed length is long enough this strategy will not be successful.

This attack leaves only half of the bits in the generated Seed changing. For a seed of length $2L_n$ bits (two concatenated nonces of length $L_n$ bits), the chance that the same nonce appears twice is $2^{-L_n}$). For example, for $L_n=|Nonce_v|=|Nonce_p|=128,$ the probability of being able to fully control the seed will be negligibly small. Therefore, one could effectively guard against any kind of random seed compromise by increasing the nonce lengths. The only overhead of this approach is a twofold increase in the runtime of the TRNG.

D. Substring Replay Attack

A dishonest Prover may mount an attack by recording the padded substrings associated with each used Seed. In this attack, a malicious Prover records the response substrings sent by an honest Prover to an honest Verifier for a specific Seed. The recording may be performed by eavesdropping on the communication channel between the legitimate Prover and Verifier. A malicious party may even pre-record a set of response substrings to various random Seeds by posing as a legitimate Verifier and exchanging nonces with the authentic Prover.

After recording a sufficiently large number of Seeds and their corresponding response substrings, the malicious party could attempt to impersonate an honest Prover. This may be done by repeatedly contacting the legitimate Verifier for authentication and then matching the generated Seeds to its pre-recorded database. This attack could only happen if the Seeds collide. Selecting a sufficiently long Seed that cannot be controlled by one party (Subsection V-B) would hinder this collision attack.

Passive eavesdropping is performed during the pre-recording phase. The chances that the whole Seed collides will be $2^{-L_n}$. The worst-case scenario is when an adversary impersonates a Verifier and controls half of the seed which reduces the collision probability to $2^{-L_n}$.

E. Exploiting Non-Idealities of PRNG and PUF

Thus far, we assumed that the outputs of PRNG and PUF are ideal and statistically unbiased. If this is not true, an attacker may resort to exploiting the statistical bias in a non-ideal PRNG or PUF to attack the system. Therefore, in this section we emphasize the importance of the PUF avalanche criterion for securing against this class of attacks.

If the PUF has poor statistical properties, then the attacker can predict patterns in the generated responses. The attacker can use these predicted patterns to guess a matching location for the substring. In other words, statistical bias in the responses will leak information about the values of secret indices.

Recall that an ideal Strong PUF should have the strict avalanche property [20]. This property states that if one bit of the PUF's input challenges is flipped, the PUF output response should flip with a ½ probability. If this property holds, the PUF output for two different challenges will be uncorrelated. This probability can be almost achieved when at least more than two independent PUF output bits are mixed by an XOR. As more independent PUF response bits are mixed, the probability of a bit flip in the output due a one bit change in the input moves closer to the ideal case; however, this linearly increases the probability of error in the mixed output. For instance, for a single Strong PUF response bit error of 5%, the probability of error for 4-XOR mixing is reported to be 19% in [20].

In our implementation, linear feedback shift registers (LFSRs) are used as a lightweight PRNG. An ideal LFSR must have the maximum length sequence property [29]. This property ensures that the autocorrelation function of the LFSR output stream is "impulsive", i.e., it is one at lag zero and is $-1/N$ for all other lags, where N is the LFSR sequences length. N should be a sufficiently large number, which renders the lagged autocorrelations very close to zero [29]. Therefore, if an LFSR generates a sequence of challenges to the PUF, the challenges are uncorrelated. In other words, for an ideal LFSR, it is highly unlikely that an attacker can find two challenges with a very small Hamming distance.

Even if the attacker finds two challenges with a small Hamming distance in the sequence, the output of our proposed PUF would be sufficiently uncorrelated to the Hamming distance of the input challenges. Therefore, a combination of PRNG and PUF with strict avalanche criteria would make this attack highly unlikely. It is worth noting that it is not required by any means for the PRNG to be a cryptographically secure generator. The seed in the protocol is public and the only purpose of the PRNG is to generate sequences of independent random challenge vectors from the Prover and Verifier nonces.

F. Man-in-the-Middle Attack on Key Exchange

Asymmetric cryptographic algorithms, such as RSA and Diffie-Hellman, are traditionally used to exchange secret keys. These asymmetric algorithms are susceptible to man-in-the-middle attacks [30]. Therefore, a certificate authority is necessary for a secure implementation of these algorithms. However, our key exchange algorithm is not susceptible to man-in-the-middle attack and no certificate authority is required for implementation.

An attacker, who intercepts the padded PUF substring, does not know the PUF response string. Therefore, he does not know the value of secret indices, and he cannot change the padded PUF substring to forge a specific key. An attacker, however, can possibly rotate the padded substring to add or subtract from the secret value of $ind_2$. Even in this case, the attacker does not know the new value of $ind_2$ and cannot act upon it to open a forged encrypted channel. Rotating the padded substring will only result in a denial of service attack which is already possible by jamming.

VI. Trade-offs in Protocol Parameters

In this section, the trade-offs in choosing the parameters of the protocols are explored by analyzing the PUF measurement data collected in the lab. False acceptance and false rejection probabilities depend on PUF error rates. There have been no comprehensive reports till this date on PUF response error rates (caused by variations in temperature and power supply conditions) nor any solid data on modeling error rates measured on real PUF challenge-response pairs. The data reported in the related literature mainly come from synthetic (emulated) PUF results rather than actual reliable PUF measurements and tests.

A. Experimental Setup

We used the data we measured and collected across 10 Xilinx Virtex 5 (LX110) FPGAs at 9 accurately-controlled operating conditions (combinations of different temperatures and power supply points). Each FPGA holds 16 PUFs and each PUF is tested using 64,000 random challenges.

Ideal PUF responses are obtained by challenging the PUF 128 times at the nominal condition (temperature=35° C. and $V_{DD}$=1V), and then taking a consensus of these responses. The error rate is now defined as the percentage deviation from the consensus response. For example, if 10 bits from the 128 bits are ones and the rest are zeros, the deviation from the majority response, or the response error rate, is (10/128)×100=7.8%.

Table II shows the average deviation (taken over 64,000 challenge-response pairs) of these experiments from the ideal response at the nominal condition. As it can be seen from this table, the error rate is substantially higher in non-nominal conditions. The worst case scenario happens when the temperature is 5° C. and the voltage is 0.95V. The table shows that 30° C. degree change in temperature will have a bigger effect on the error rate than a 5% voltage change.

TABLE II

AVERAGE BIT ERROR RATE OF PUF IN DIFFERENT VOLTAGE AND TEMPERATURE CONDITIONS IN COMPARISON WITH THE IDEAL PUF OUTPUT AT NOMINAL CONDITION

| | Temperature | | |
|---|---|---|---|
| $V_{DD}$ | 5° C. | 35° C. | 65° C. |
| 0.95 V | 8.4% | 6.2% | 7.1% |
| 1.00 V | 6.8% | 3.1% | 6.4% |
| 1.05 V | 7.2% | 6.7% | 7.9% |

As mentioned earlier, the Verifier repeatedly tests the PUF in the factory to obtain a consensus of the PUF responses for an array of random challenges. The Verifier then uses the reliable response bits to build a PUF Model for himself. When the PUF is deployed in the field, the Prover challenges its own PUF and send the responses to the Verifier. The average error rate of the prover response in different working conditions against the Verifier's model is listed in Table III.

TABLE III

AVERAGE BIT ERROR RATE OF THE VERIFIERS PUF MODEL AGAINST THE PUF OUTPUTS IN DIFFERENT VOLTAGE AND TEMPERATURE CONDITIONS.

| | Temperature | | |
|---|---|---|---|
| $V_{DD}$ | 5° C. | 35° C. | 65° C. |
| 0.95 V | 13.2% (*) | 10.5% | 10.7% |
| 1.00 V | 8.9% | 6.4% | 8.9% |
| 1.05 V | 9.3% | 10.2% | 11.8% |

(*) THE WORST-CASE SCENARIO.

The listed errors are the compound of two types of error. The first type is the error in PUF output due to noise of environment as well as operating condition fluctuations. The second type is the inevitable modeling error of the Verifier's PUF model. These error rates are tangibly higher than the error rates of Table II. The worst error rate is recorded at 5° C. temperature and voltage of 0.95V. This error rate is taken as the worst-case error rate between an honest Verifier and an honest Prover. We will use this error rate to estimate the false acceptance and false rejection probability of the authentication protocol.

B. Modeling Attack Complexity and Protocol Parameters

As explained earlier, the attack complexity depends exponentially on the minimum required number of challenge-response pairs (CRPs), i.e., $N_{min}$, to reach a modeling error rate of less than di, the matching threshold in the protocol. The matching threshold in the protocol is incorporated to create a tolerance for errors in the responses caused by modeling error as well as errors due to environment variations and noise.

By relaxing the tolerance for errors in the protocol (i.e., increasing di), we basically increase the probability of attack. In contrast, by lowering the tolerance for errors, the rate at which the authentication of a genuine PUF fails due to noisy responses increases. As a rule of thumb, the tolerance has to be set greater than the maximum response error rate to achieve sensible false rejection and false acceptance probabilities.

Once the tolerance level (th) is fixed to achieve the desired false rejection and false acceptance probabilities, $N_{min}$ must be increased to hinder modeling attacks. However, $N_{min}$ and th are inter-related for a given PUF structure. In other words, for a given fixed PUF structure, increasing th mandates that a less accurate model can pass the authentication, and that model can be trained with a smaller number of CRPs (smaller $N_{min}$). The only way to achieve a higher $N_{min}$ for a fixed th is to change the PUF structure.

Earlier in the patent disclosure, we discussed using XOR PUFs instead of a single arbiter-based PUF in order to increase $N_{min}$ for a fixed th. As reported previously in the related literature, XORing the PUF outputs makes the machine learning more difficult and requires a larger CRP set for model building. The major problem with XORing the PUF outputs is error accumulation. For example, if the outputs of two arbiter-based PUFs are mixed with XORs, the XOR PUF response error rate will be about the sum of each individual arbiter-based PUF's errors. This means the error tolerance also has to be doubled to have reliable operation. This observation of trade-off between $N_{min}$ and th, led us to quantify this effect.

In order to quantify the trade-off between $N_{min}$ and th, we first calculate the effective compound error rate of XOR-mixed PUF outputs for different operating conditions and different numbers of PUF stages. Tables IV, V and VI show the effective response error rate respectively for 2-input, 3-input and 4-input XOR PUF.

TABLE IV

2-INPUT XOR

| $V_{DD}$ | Temperature | | |
|---|---|---|---|
| | 5° C. | 35° C. | 65° C. |
| 0.95 V | 24.7% | 19.9% | 20.3% |
| 1.00 V | 17.0% | 12.4% | 17.0% |
| 1.05 V | 17.7% | 19.4% | 22.2% |

TABLE V

3-INPUT XOR

| $V_{DD}$ | Temperature | | |
|---|---|---|---|
| | 5° C. | 35° C. | 65° C. |
| 0.95 V | 34.6% | 28.3% | 28.8% |
| 1.00 V | 24.4% | 18.0% | 24.4% |
| 1.05 V | 25.4% | 27.6% | 31.4% |

TABLE VI

4-INPUT XOR

| $V_{DD}$ | Temperature | | |
|---|---|---|---|
| | 5° C. | 35° C. | 65° C. |
| 0.95 V | 43.2% | 35.8% | 36.4% |
| 1.00 V | 31.1% | 23.2% | 31.1% |
| 1.05 V | 32.3% | 35.0% | 39.6% |

According to the above tables, the maximum error rates measured from the XOR PUF responses are 24.7%, 34.6% and 43.2% for 2-input, 3-input and 4-input XOR-ed PUF, respectively. To guarantee reliable authentication at all operating conditions, the error tolerance (th) of the protocol must be set above the maximum error rates. Now after deriving the PUF error rate, we would like to know how many challenge-response pairs are required to train the PUF model and reach a modeling error rate that falls below the tolerance level. In other words, we need to know how many challenge-response pairs the adversary needs to collect in order to pass the authentication and break the system.

To answer this question, we trained and tested the PUF model on the data collected in the lab from real PUF implementations. We measured the modeling accuracy as a function of train/test set size for each PUF. The results in FIG. 7 show the modeling error using evolutionary strategy (ES) machine learning methods.

Figure 7:
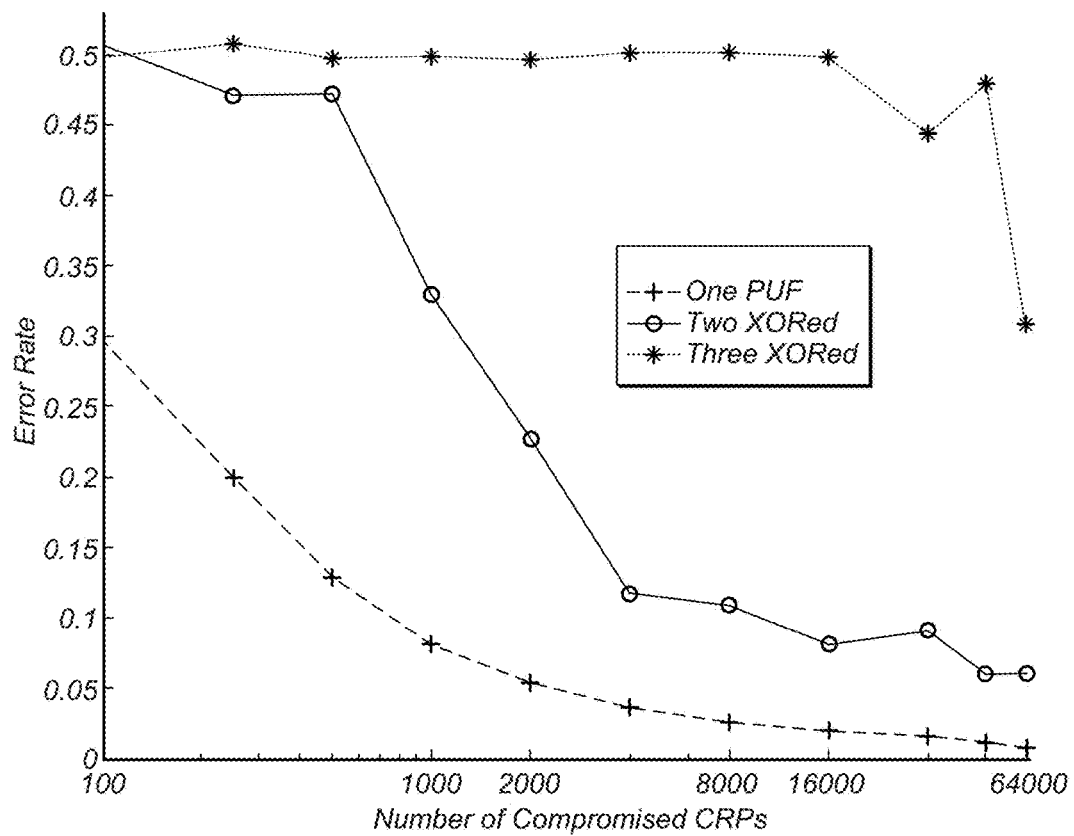
FIG. 7 illustrates the modeling error rate for an arbiter-based PUF, and XOR PUFs with 2 and 3 outputs as a function of number of train/test CRPs, according to one set of embodiments.

Based on the results in FIG. 7, the largest value of $N_{min}$, after taking into account the error threshold (th) derived earlier, is achieved for an XORed-PUF with 3 stages. In other words, 64,000 CRPs must be collected to achieve a modeling error rate of less than 34.6%. Therefore, $N_{min}$=64,000 for 3-stage XOR-ed PUF.

Table VII shows the false rejection and false acceptance error rate of our protocol with the length of PUF response sequence and the length of additional pads fixed at 1028 and 512, respectively. False rejection rate is the rate at which the service to the truthful Prover is disrupted. It may be calculated using Eq. 6: $1-P_{ADV}$.

TABLE VII

FALSE REJECTION AND ACCEPTANCE ERROR PROBABILITIES FOR DIFFERENT PROTOCOL PARAMETERS

| $L_{sub}$ | 1250 | | |
|---|---|---|---|
| Error threshold | 487 | 477 | 467 |
| Fake rejection | 0.2% | 1% | 5% |
| False acceptance | 9e−10 | 0 | 0 |

The requirements on the false rejection rate are not usually as stringent as the requirements on the false acceptance rate. However, one should assume that a customer would deem a product impractical if the false rejection rate is higher than a threshold. In our protocol design, we tune the system parameter to achieve a false negative rate of 1%, while minimizing the false acceptance rate. Also, we take the worst-case error rate as the basis of our calculation of false acceptance and false rejection rates. The error rates that we report are the upper bound of what can be observed in the field by a customer/Prover.

Table VII shows that the desired false rejection rate of 1% with an acceptable false acceptance rate is achieved when $L_{sub}$=1250 and the error threshold is

477/1250=38%.

In this scenario, an adversary needs to perform $$O((1300 \cdot 512)^{(64000/1250)}) \approx O(2^{988})$$

machine learning attacks in order to break this system, which makes the system secure against all computationally-bounded adversaries.

At the end, it should be noted that the worst case bit error rate of our PUF implementation (13.2% in Table III) is much higher than a recently reported bit error rate of arbiter PUFs [31] (≈3-5%). The discrepancy might be explained by the fact that their implementation is based on a 65 nm ASIC technology and ours is based on a Virtex 5 FPGA. Therefore, the reported security performance of our protocol has the potential to be further enhanced by a more custom implementation with a lower bit error rate.

VII. Hardware Implementation

Figure 8:
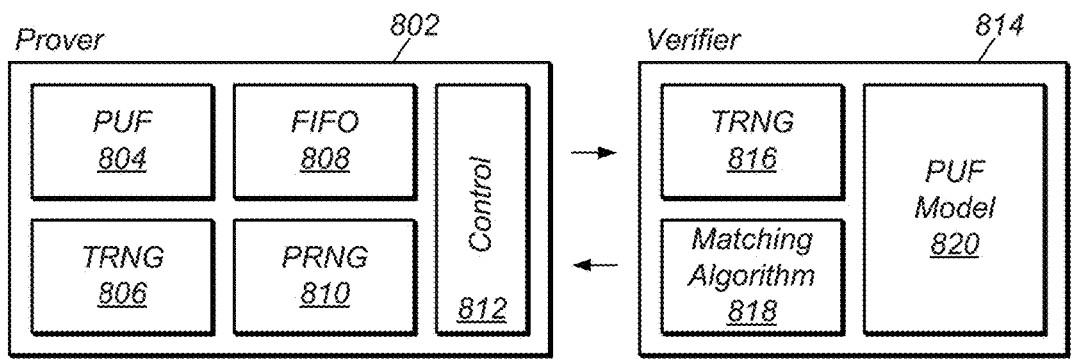
FIG. 8 illustrates resource usage on the Prover side and the Verifier side, according to one embodiment.

In this section, we present an FPGA implementation of our protocol for the Prover side on Xilinx Virtex 5 XC5VLX110T FPGAs. FIG. 8 summarizes the resources on the Prover side and the Verifier side of the protocols, according to one embodiment. Since there is a stricter power consumption requirement on the lightweight Prover, we focus our evaluation on Prover implementation overhead. The computation on the Verifier side can run solely in software, however, the computation on the Verifier may also be carried out in hardware with negligible overhead.

The Verifier 802 may include a physical unclonable function (PUF) 804, a true random number generator (TRNG) 806, a FIFO buffer 808, a pseudo-random number generator (PRNG) 810 and a controller 812. The Verifier 814 may be implemented in software. For example, the Verifier 814 may include software modules such as a TRNG module 816, a matching algorithm unit 818 and a PUF model 820.

It is desirable to use a low overhead PUF implementation, such as the one introduced in [32]. If an ASIC or analog implementation of the PUF is required, the ultra-low power architecture in [28] is suitable for this protocol. (ASIC is an acronym for Application Specific Integrated Circuit.) A very low-power Verifier implemented by a microcontroller such as the Texas Instruments MSP430 can easily challenge the PUF and run the subsequent steps of the protocol.

We use the implementation of the arbiter-based PUF in [33]. The arbiter-based PUF on FPGA is designed to have 64 input challenges. In total, 128 look-up tables (LUTs) and one flip-flop are used to generate one bit of response. To achieve a higher throughput, multiple parallel PUFs can be implemented on the same FPGA.

Figure 9:
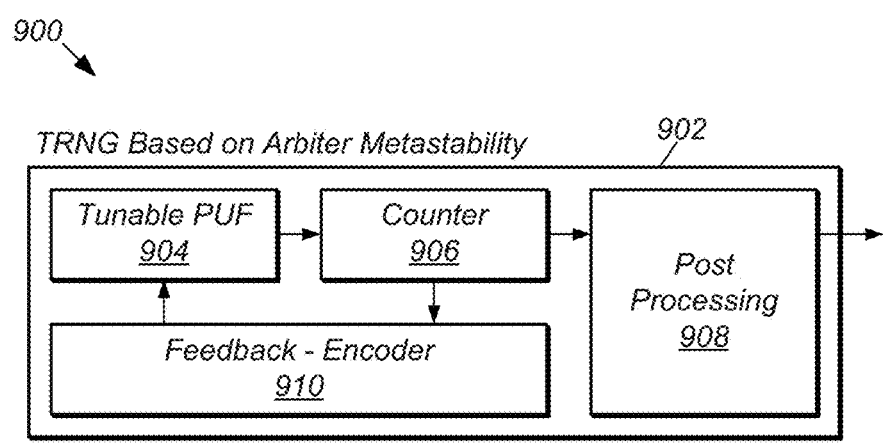
FIG. 9 illustrates one embodiment of a true random number generation architecture, based on flipflop metastability.

There are various existing implementations for TRNGs on FPGAs [34], [35]. We use the architecture presented in [32] to implement a true random number generator. One embodiment of the TRNG architecture is shown in FIG. 9. This TRNG (denoted by label 900) may include a tunable PUF 904, a counter 906, a feedback-encoder unit 910 and a post-processing unit 908. The TRNG 900 may operate by enforcing a meta-stable state on the flipflop (in the tunable PUF 904) through a closed loop feedback system.

The TRNG 900 has a tunable PUF as its core that consumes 128 LUTs that are packed into 16 CLBs on Virtex 5. (CLB is an acronym for "configurable logic blocks".) The PUF of the TRNG may be identical to the arbiter-based PUF except that the switches act as tunable programmable delay lines. The core is incorporated inside a closed-loop feedback system. The core output is attached to the counter 906 (e.g., a 12-bit counter using 12 registers) which monitors the arbiter's meta-stability. If the arbiter operates in a purely meta-stable fashion, the output bits from the counter become equally likely ones and zeros. The counter basically measures and monitors deviation from this condition, and generates a difference feedback signal to guide the system to return back to its meta-stable state. The counter output drives an encoding table (e.g., a table of depth $2^{12}$) in feedback-encoder unit 910. Each row of the encoding table contains a 128-bit word, resulting in a 64 KByte ROM. A table of size $2^{12} \times 8$-bits (=4 KByte) implemented by a RAM block is used to gather and update statistics for online post processing. The online post processing may be performed by post-processing unit 908.

The nonce size is set to 128 for both the Prover and Verifier. Each 128-bit nonce is fed into a 128-bit LFSR. The content of the two LFSRs are XORed to form the challenges to the tunable PUF 904.

The propagation delay through the PUF and the TRNG core is equal to 61.06 ns. PUF outputs can be generated at a maximum rate of 16 Mbit/sec. Post-processing on the TRNG output bits can lower the throughput from 16 Mbit/sec to 2 Mbit/sec. Since the TRNG is only used to generate the nonce and the indices, we can run TRNG before the start of the protocol and pre-record these values. Therefore, its throughput does not affect the overall system performance.

TABLE VIII

IMPLEMENTATION OVERHEAD ON VIRTEX 5 FPGA

| No. | Type | LUT | Registers | RAM blocks | ROM blocks | Clock Cycles |
| --- | --- | --- | --- | --- | --- | --- |
| 4 | PUF | 128 | 1 | 0 | 0 | 1 |
| 1 | TRNG | 128 | 12 | 4 KB | 64 KB | 8 |
| 1 | FIFO | 0 | 1250 | 0 | 0 | N/A |
| 2 | LFSR | 2 | 128 | 0 | 0 | N/A |
| 1 | Control | 12 | 9 | 0 | 0 | N/A |
| Total | | 652 | 1400 | 4 KB | 64 KB | N/A |

The implementation overhead of our authentication protocol is much less than traditional cryptographic modules. For example, robust hashing implementation of SHA-2 as implemented in [36] requires at least 1558 LUTs of a Virtex-II FPGA and it takes 490 clock cycles to evaluate. This overhead will occur on the top of the clock cycles required for PUF evaluation.

The overhead of our key exchange protocol should be compared against symmetric key-exchange algorithms not asymmetric key-exchange ones, since our protocol assumes that a secret PUF as a token has been pre-distributed between the Provers. Our key exchange protocol achieves a desired level of security with minimal computational overhead. For example, AES-128 as implemented in [37] requires at least 738 LUTs of a Virtex-V FPGA, which is higher than the combined overhead of our authentication and key-exchange as listed in Table VIII.

VIII. Conclusions and Future Direction

We have presented secure and low-overhead authentication and key-exchange protocols based on PUFs. In the authentication protocol, the Prover may reveal only a random subset of responses for authentication. The Verifier, which has access to a compact model of the PUF, can search and match the received substring with the estimated PUF response string. The authentication is declared to be successful if a sufficiently close match is found. A key-exchange protocol based on pattern matching has also been described herein. We have demonstrated that carefully-designed protocols based on the pattern-matching concept provides a much higher level of resiliency against all machine learning attacks know to the authors. The experimental results on FPGAs showed a significantly lower area and speed overhead compared to any protocol that potentially uses conventional cryptographic modules such as hashing. An even smaller footprint and power consumption can potentially be achieved by using analog leakage based PUFs, analog TRNGs, and low power micro-controllers.

Figure 10:
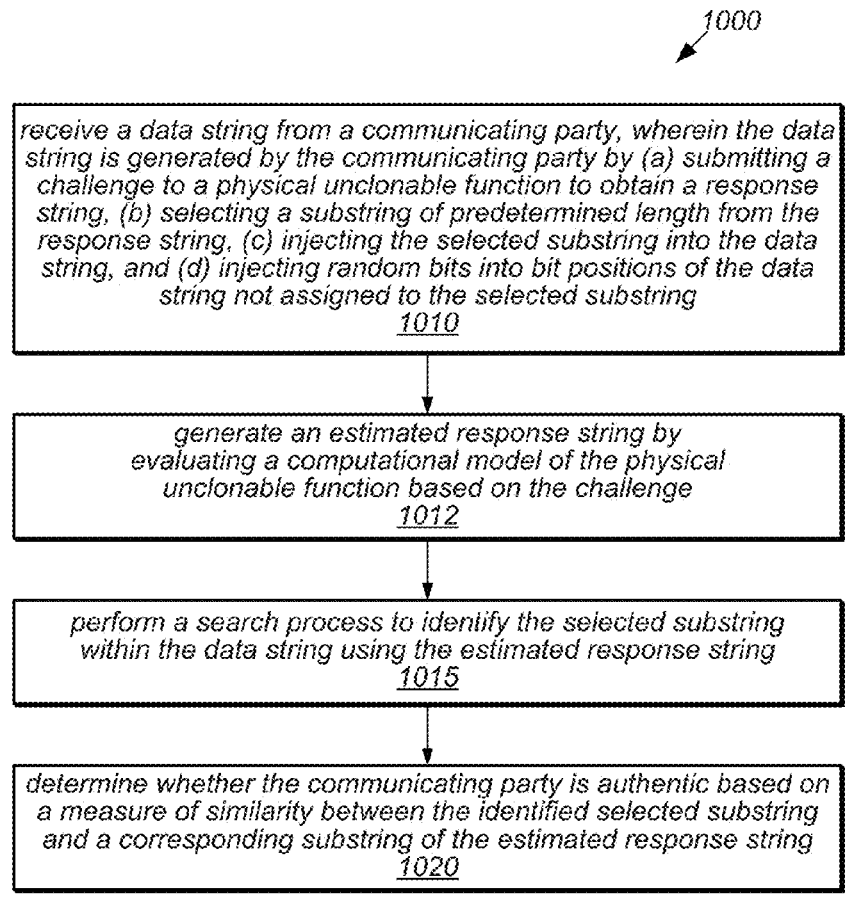
FIG. 10 illustrates one embodiment of a method for operating a verifier device to verify the authenticity of a communicating party.

In one set of embodiments, a method 1000 may involve the operations shown in FIG. 10. (Furthermore, the method 1000 may include any subset of the features, elements and embodiments described above.) The method 1000 is useful for operating a verifier device to verify the authenticity of a communicating party. The verifier device may include digital circuitry that is configured to perform the method 1000 or certain elements of the method 1000.

At 1010, the verifier device (e.g., a receiver subsystem of the verifier device) may receive a data string from the communicating party via a communication medium. The data string is generated by the communicating party by: (a) submitting a challenge to a physical unclonable function to obtain a response string, (b) selecting a substring of predetermined length from the response string, (c) injecting the selected substring into the data string, and (d) injecting random bits into bit positions of the data string not assigned to the selected substring. In some embodiments, the selected substring may be injected into the data string at any start position within the data string. If the start position is sufficiently close to the end of the data string, the selected substring wraps from the end of the data string to the beginning of the data string, as described above in the discussion of circular paddding. In other embodiments, the selected substring is not allowed to circularly wrap, and is injected into the data string as one contiguous whole. Thus, the start position may be constrained, e.g., to the range $\{0, 1, 2, \ldots, L_{PW}-L_{sub}\}$, where $L_{PW}$ represents the length of the data string, and $L_{sub}$ represents the length of the selected substring.

The position of the selected substring within the data string is a secret, not revealed by the communicating party. Indeed, the communicating party intentionally obfuscates the position of the selected substring by injecting the random bits into the data string. Likewise, the position of the selected substring within the response string is a secret, not revealed by the communicating party.

The physical unclonable function is a hardware device that receives a challenge (vector of input bits) and produces a response (a vector of output bits), where the space of possible challenges and the space of possible responses are vast, where the relationship between challenge and response is complicated and unique to the hardware device. Thus, it may be difficult or impossible to accurately model the challenge-response relationship even when given a larger number of challenge-response pairs. However, one may generate a sufficiently accurate model of the input-output relationship if access to internal components or internal nodes of the hardware device is available, e.g., as variously described above.

In some embodiments, the processes used to manufacture such hardware devices may involve uncontrollable small-scale randomness such that the challenge-response relationship of the hardware devices will be very different even though they are manufactured according to the same nominal design, i.e., having the same components with the same set of nominal parameters. In other embodiments, the manufacturing processes may involve explicitly-introduced randomness. In yet other embodiments, the manufacturing processes may involve a combination of intrinsic randomness and explicitly-introduced randomness.

The physical unclonable function is realized using specialized circuitry, not in software (i.e., not by executing a computer program on a processor). The specialized circuitry includes digital circuit elements at least to receive the challenge bits and output the response bit. However, in many embodiments, the specialized circuitry may include digital circuit elements in its internal architecture. In some embodiments, the specialized circuitry may also include analog circuit elements.

At 1012, the digital circuitry may generate an estimated response string by evaluating a computational model of the physical unclonable function based on the challenge, i.e., the same challenge used by the communicating party to generate the original response string. (The computational model for the physical unclonable function may be generated using any of the techniques described above or using any other technique known in the art.) In some embodiments, the verifier device and the communicating party may exchange information to determine the challenge, e.g., as described above in connection with FIG. 4. In other embodiments, the communicating party may generate the challenge and send it to the verifier device. In yet other embodiments, the verifier device may generate the challenge and send it to the communicating party.

The verifier device may be configured to maintain the parameters of the computational model as a secret. The parameters may be intentionally concealed from public access, or from access by agents external to the verifier device.

At 1015, the digital circuitry may perform a search process to identify the selected substring within the data string using the estimated response string. (See, e.g., FIG. 6B.) The digital circuitry knows the length of the selected substring as well as the length of the data string. Indeed, in some embodiments, both lengths may be public knowledge.

The search process 1015 may determine the relative shift between the data string and the estimated response string that produces the maximum alignment (or similarity) between the two strings. In some embodiments, the search process may be a sequence alignment algorithm such as the Needleman-Wunsch algorithm.

At 1020, the digital circuitry may determine whether the communicating party is authentic based on a measure of similarity between the identified selected substring and a corresponding substring of the estimated response string. In some embodiments, the measure of similarity is Hamming distance.

In some embodiments, the action of selecting a substring of predetermined length from the response string may include randomly selecting a number (e.g., the value of the index $ind_1$), where a start position of the substring within the response string is determined by the randomly-selected number.

In other embodiments, the action of selecting a substring of predetermined length from the response string may include determining a number by encoding (or perhaps, simply selecting) a non-empty subset of bits from a key, where a start position of the substring within the response string is determined by the number, e.g., as described above in the discussion of the key-exchange protocol. Any desired encoding scheme may be employed, including the trivial encoding that leaves the subset of bits unaltered. (The term "key" is used here in the generic sense of any secret data that the communicating party desires to send to the verifier device without revealing the secret data to other parties.) The search process may provide an estimate of the number. Thus, the method 1000 may also include recovering the non-empty subset of bits of the key from the estimated number (e.g., by performing a decoding process that effectively inverts the encoding process). If the key is too long to encode in a single data-string transmission, a plurality of such transmissions may be used to convey respective portions of the key, until the complete key has been communicated.

In some embodiments, the action of generating the data string includes randomly selecting a number (e.g., the value of the index $ind_2$, where the number determines the start position of the selected substring within the data string.

In some embodiments, the action of generating the data string may include determining a number by encoding (or perhaps, simply selecting) a non-empty subset of bits from a key, where a start position of the selected substring within the data string is determined by the number. (Any desired encoding scheme may be employed, including the trivial encoding that leaves the subset of bits unaltered.) The search process may provide an estimate of the number. Thus, the method 1000 may also include recovering the non-empty subset of bits of the key from the estimate of the number.

Figure 11:
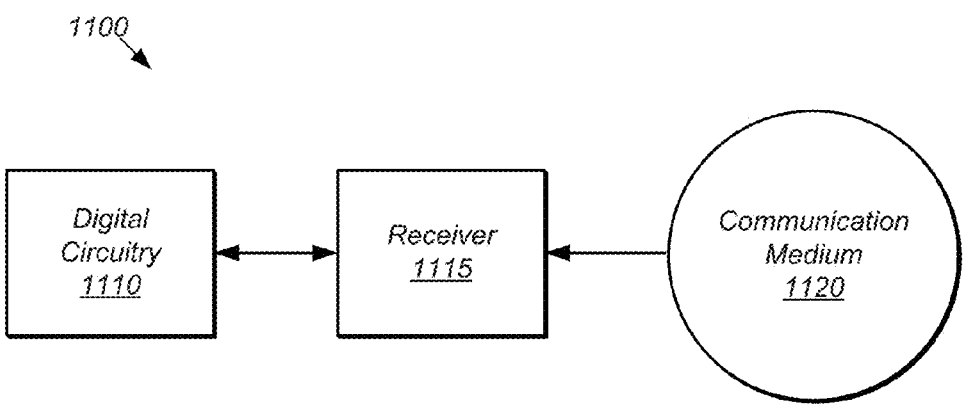
FIG. 11 illustrates one embodiment of a system 1100 for verifying authenticity of a communicating party.

In one set of embodiments, a system 1100 for verifying authenticity of a communicating party may include a receiver 1110 and digital circuitry 1115, e.g., as shown in FIG. 11. (The system 1100 may also include any subset of the features, elements and embodiments described above.)

The receiver 1110 may be configured to receive a data string from the communicating party, e.g., via a communication medium 1120. The data string may be generated by the communicating party by (a) submitting a challenge to a physical unclonable function to obtain a response string, (b) selecting a substring of predetermined length from the response string, (c) injecting the selected substring into the data string, and (d) injecting random bits into bit positions of the data string not assigned to the selected substring.

The communication medium 1120 may include any desired physical medium or combination of physical media for the communication of information. In some embodiments, the communication medium may include a computer network such as the Internet.

The digital circuitry 1115 may be configured to: generate an estimated response string by evaluating a computational model of the physical unclonable function based on the challenge; and perform a search process to identify the selected substring within the data string using the estimated response string.

The digital circuitry 1115 may be further configured to determine whether the communicating party is authentic based on a measure of similarity between the identified selected substring and a corresponding substring of the estimated response string, e.g., as variously described above.

In some embodiments, the digital circuitry 1115 includes one or more of the following: a processor operating under the control of stored program instructions; one or more programmable hardware devices; one or more application-specific integrated circuits.

In some embodiments, the system 1100 may also include a transmitter, e.g., combined with the receiver in a transceiver unit. Thus, the system 1110 may engage in two-way communication with the communicating party. The transmitter and/or receiver may be realized using of a wide variety of existing technologies.

Figure 12:
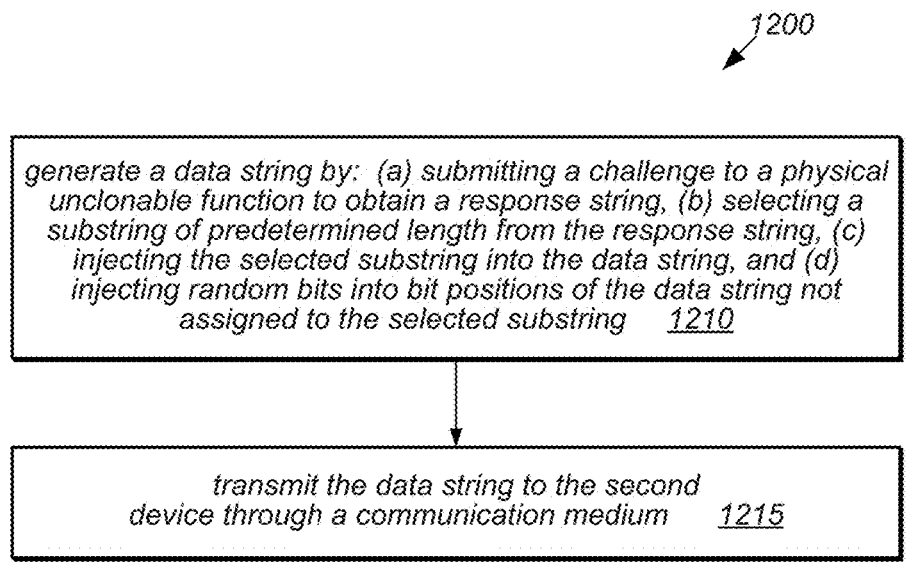
FIG. 12 illustrates one embodiment of a method for operating a prover device so that a verifier device is enabled to authenticate the prover device.

In one set of embodiments, a method 1200 may involve the operations shown in FIG. 12. (The method 1200 may also include any subset of the features, elements and embodiments described above.) The method 1200 may be used for operating a prover device so that a verifier device is enabled to authenticate the prover device. The prover device is so named because it is attempting to prove its authenticity to the verifier device. The verifier device is so named because is it responsible for verifying the authenticity of the prover device.

At 1210, digital circuitry of the prover device may generate a data string by: (a) submitting a challenge to a physical unclonable function to obtain a response string, (b) selecting a substring of predetermined length from the response string, (c) injecting the selected substring into the data string, and (d) injecting random bits into bit positions of the data string not assigned to the selected substring.

The physical unclonable function (PUF) may be realized as variously described above. It is typically preferably for the PUF to be a strong PUF. In some embodiments, the PUF is an arbiter linear PUF or an XOR-mixed combination of linear arbiter PUFs.

At 1215, a transmitter of the prover device may transmit the data string to the verifier device through a communication medium. As variously described above, the position of the selected substring within the response string and the position of the selected substring within the data string are secrets, not revealed by the prover device. Thus, even if a dishonest party is able to gain access to a large number of the transmitted data strings (e.g., by monitoring the communication medium over a period of time), it will have great difficulty reverse-engineering the physical unclonable function, i.e., determining a usefully-accurate model of the functional relationship between challenge and response of the physical unclonable function.

In some embodiments, the action of selecting a substring of predetermined length from the response string includes randomly selecting a number, where a start position of the substring within the response string is determined by the randomly selected number.

In some embodiments, the action of selecting a substring of predetermined length from the response string includes determining a number by encoding (or perhaps, simply selecting) a non-empty subset of bits from a key, where a start position of the substring within the response string is determined by the number.

In some embodiments, the action 1210 of generating the data string includes randomly selecting a number, where the number determines a start position of the selected substring within the data string.

In some embodiments, the action 1210 of generating the data string includes determining a number by encoding (or perhaps, simply selecting) a non-empty subset of bits from a key, where a start position of the selected substring within the data string is determined by the number.

Figure 13:
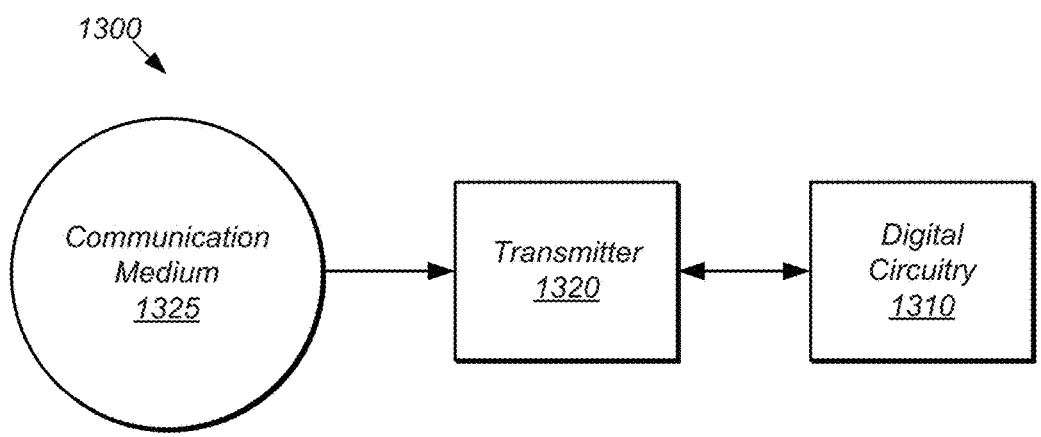
FIG. 13 illustrates one embodiment of a prover system 1300.

In one set of embodiments, a prover system 1300 may include digital circuitry 1310 and a transmitter 1320, e.g., as shown in FIG. 13. (The prover system 1300 may also include any subset of the features, elements and embodiments described above.)

The digital circuitry 1310 may be configured to generate a data string by: (a) submitting a challenge to a physical unclonable function to obtain a response string, (b) selecting a substring of predetermined length from the response string, and (c) injecting the selected substring into the data string, and (d) injecting random bits into bit positions of the data string not assigned to the selected substring. The physical unclonable function may be configured as variously described above.

The transmitter 1320 may be configured to transmit the data string to a verifier system through a communication medium 1325. The transmitter may be realized using any of a wide variety of conventional transmitter technologies.

In some embodiments, the digital circuitry 1310 includes one or more of the following: a processor operating under the control of stored program instructions; one or more programmable hardware devices; one or more application-specific integrated circuits.

The prover system 1300 has access to the physical unclonable function so that it can submit challenges to and receive responses from the physical unclonable function. In some embodiments, the physical unclonable function is included as part of the prover system.

In some embodiments, the physical unclonable function includes one or more arbiter linear PUFs, e.g., as variously described above.

In some embodiments, a verifier system is configured to authenticate the prover system based on the data string, the challenge, and a computational model of the physical unclonable function, e.g., as variously described above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a device to verify the authenticity of a communicating party, the method comprising:
   receiving a data string from the communicating party, wherein the data string is generated by the communicating party by:
   (a) submitting a challenge to a physical unclonable function to obtain a response string,
   (b) selecting a substring of predetermined length from the response string,
   (c) injecting the selected substring onto a continuous range of bit positions within the data string, wherein a start position of the selected substring within the data string is determined by a variable number that is not communicated to said device, and
   (d) injecting random bits into bit positions of the data string not assigned to the selected substring, wherein said generating the data string also includes randomly selecting the variable number;
   generating an estimated response string by evaluating a computational model of the physical unclonable function based on the challenge;
   performing a search process to identify the selected substring within the data string using the estimated response string;
   determining whether the communicating party is authentic based on a measure of similarity between the identified selected substring and a corresponding substring of the estimated response string, wherein said generating, said performing and said determining are performed by digital circuitry.

2. The method of claim 1, wherein the search process is a maximum-sequence alignment algorithm.

3. The method of claim 1, wherein said selecting a substring of predetermined length from the response string includes:
   determining a start number by encoding a non-empty subset of bits from a cryptographic key, wherein a start position of the sub string within the response string is determined by the start number.

4. The method of claim 3, wherein said search process provides an estimate of the start number, wherein the method further comprises:
   recovering the non-empty subset of bits of the cryptographic key from the estimate of the start number.

5. The method of claim 1, wherein said randomly selecting the variable number includes:
   determining the variable number by encoding a non-empty subset of bits from a cryptographic key.

6. The method of claim 5, wherein said search process provides an estimate of the number, wherein the method further comprises:
   recovering the non-empty subset of bits of the cryptographic key from the estimate of the number.

7. A system for verifying authenticity of a communicating party, the system comprising:
   a receiver configured to receive a data string from the communicating party, wherein the data string is generated by the communicating party by:
   (a) submitting a challenge to a physical unclonable function to obtain a response string,
   (b) selecting a substring of predetermined length from the response string,
   (c) injecting the selected substring onto a continuous range of bit positions within the data string, wherein a start position of the selected substring within the data string is determined by a variable number that is not communicated to said receiver, and
   (d) injecting random bits into bit positions of the data string not assigned to the selected substring, wherein said generating the data string also includes randomly selecting the variable number;
   digital circuitry configured to:
   generate an estimated response string by evaluating a computational model of the physical unclonable function based on the challenge;
   perform a search process to identify the selected substring within the data string using the estimated response string;
   determine whether the communicating party is authentic based on a measure of similarity between the identified selected substring and a corresponding substring of the estimated response string.

8. The system of claim 7, wherein the digital circuitry comprises one or more of the following:
   a processor operating under the control of stored program instructions;
   one or more programmable hardware devices;
   one or more application-specific integrated circuits.

9. A method for operating a first device so that a second device is enabled to authenticate the first device, the method comprising:
   generating a data string by:
   (a) submitting a challenge to a physical unclonable function to obtain a response string,
   (b) selecting a substring of predetermined length from the response string,
   (c) injecting the selected substring onto a continuous range of bit positions within the data string, wherein a start position of the selected substring within the data string is determined by a variable number that is not communicated to said second device, and
   (d) injecting random bits into bit positions of the data string not assigned to the selected substring, wherein said generating the data string also includes randomly selecting the variable number; and
   transmitting the data string to the second device through a communication medium, wherein the data string is usable by the second device to authenticate the first device.

10. The method of claim 9, wherein said selecting a substring of predetermined length from the response string includes:
randomly selecting a start number, wherein a start position of the substring within the response string is determined by the start number.

11. The method of claim 9, wherein said selecting a substring of predetermined length from the response string includes:
determining a start number by encoding a non-empty subset of bits from a cryptographic key, wherein a start position of the sub string within the response string is determined by the start number.

12. The method of claim 9, wherein said randomly selecting the variable number includes:
determining the variable number by encoding a non-empty subset of bits from a cryptographic key.

13. A prover system comprising:
digital circuitry configured to generate a data string by:
  (a) submitting a challenge to a physical unclonable function to obtain a response string,
  (b) selecting a substring of predetermined length from the response string,
  (c) injecting the selected substring onto a continuous range of bit positions within the data string, wherein a start position of the selected substring within the data string is determined by a variable number that is not communicated to a verifier system, and
  (d) injecting random bits into bit positions of the data string not assigned to the selected substring, wherein said generating the data string also includes randomly selecting the variable number; and
a transmitter configured to transmit the data string to the verifier system through a communication medium, wherein the data string is usable by the verifier system to authenticate the prover system.

14. The prover system of claim 13, wherein the digital circuitry comprises one or more of the following:
a processor operating under the control of stored program instructions;
one or more programmable hardware devices;
one or more application-specific integrated circuits.

15. The prover system of claim 13, further comprising:
the physical unclonable function.

16. The prover system of claim 13, wherein the physical unclonable function includes one or more arbiter linear physical unclonable functions.

17. The prover system of claim 13, wherein the verifier system is configured to authenticate the prover system based on the data string, the challenge, and a computational model of the physical unclonable function.

* * * * *